US007821663B2

(12) United States Patent
Yamada et al.

(10) Patent No.: US 7,821,663 B2
(45) Date of Patent: Oct. 26, 2010

(54) IMAGE SUPPLY DEVICE, CONTROL METHOD OF THE DEVICE, AND PRINTING SYSTEM

(75) Inventors: Akitoshi Yamada, Yokohama (JP); Masao Kato, Kawasaki (JP); Nobuo Onuma, Yokohama (JP); Ruriko Mikami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 11/736,340

(22) Filed: Apr. 17, 2007

(65) Prior Publication Data

US 2007/0182993 A1 Aug. 9, 2007

Related U.S. Application Data

(63) Continuation of application No. PCT/JP2005/019409, filed on Oct. 21, 2005.

(30) Foreign Application Priority Data

Oct. 21, 2004 (JP) .............................. 2004-306899

(51) Int. Cl.
*G06F 15/00* (2006.01)
*G06F 15/16* (2006.01)
(52) U.S. Cl. ...................... 358/1.15; 709/229
(58) Field of Classification Search ................ 358/1.15, 358/1.16, 1.18, 1.14, 1.13, 1.9, 2.1, 518, 358/521, 552, 426.2, 436, 488, 504, 462; 382/276, 112, 107; 709/203, 219, 229; 399/13, 399/16, 45, 80, 82; 715/229, 200; 400/76, 400/82
See application file for complete search history.

(56) References Cited

U.S. PATENT DOCUMENTS

| 6,940,541 | B1 | 9/2005 | Small |
| 7,589,862 | B2 * | 9/2009 | Uchida et al. ................. 358/1.9 |
| 2001/0013894 | A1 | 8/2001 | Parulski et al. |
| 2003/0156196 | A1 | 8/2003 | Kato et al. ............... 348/207.2 |
| 2003/0174351 | A1 | 9/2003 | Kawanabe et al. |

(Continued)

FOREIGN PATENT DOCUMENTS

EP   1 389 000 A2   2/2004

(Continued)

OTHER PUBLICATIONS

International Preliminary Report on Patentability Application No. PCT/JP2005/019409 filed Aug. 2, 2007.

*Primary Examiner*—Saeid Ebrahimi Dehkordy
(74) *Attorney, Agent, or Firm*—Fitzpatrick, Cella, Harper & Scinto

(57) ABSTRACT

In this invention, to enable printing of an image that has undergone an image process or print process complying with the desire of a user on an image supply device side, real object handles and virtual object handles are set to, of images to be supplied to the printing device, images that require a predetermined image process and remaining images, respectively. A print job including the object handle of a print target image is issued in accordance with a print instruction. If the handle of an image requested by the printing device in response to the issued print job is a virtual object handle, the predetermined image process is executed for image data corresponding to the handle, and the processed image data is supplied to the printing device.

15 Claims, 18 Drawing Sheets

U.S. PATENT DOCUMENTS

| | | | |
|---|---|---|---|
| 2004/0252335 A1 | 12/2004 | Yano et al. | 358/1.15 |
| 2005/0219555 A1 | 10/2005 | Onuma et al. | 358/1.1 |
| 2006/0044395 A1 | 3/2006 | Aichi et al. | 348/207.2 |
| 2006/0072895 A1 | 4/2006 | Yamada et al. | 386/46 |
| 2006/0098938 A1 | 5/2006 | Goto et al. | 386/46 |
| 2007/0195362 A1 | 8/2007 | Yamada et al. | 358/1.15 |

FOREIGN PATENT DOCUMENTS

| | | |
|---|---|---|
| JP | 8-032911 | 2/1996 |
| JP | 10-290470 | 10/1998 |
| JP | 2003-134457 | 5/2003 |
| JP | 2003-250108 | 9/2003 |
| JP | 2004-129221 | 4/2004 |

\* cited by examiner

FIG. 7

```
<?xml version="1.0"?>
  <dps xmlns="http://xxxx/schema/">
  <output>
    <result>10000000</result>
    <getCapability>
      <capability>
        <paperSizes> 80010000  80010001  80010002     ←—700
        </paperSizes>
      </capability>
    </getCapability>
  </output>
</dps>
```

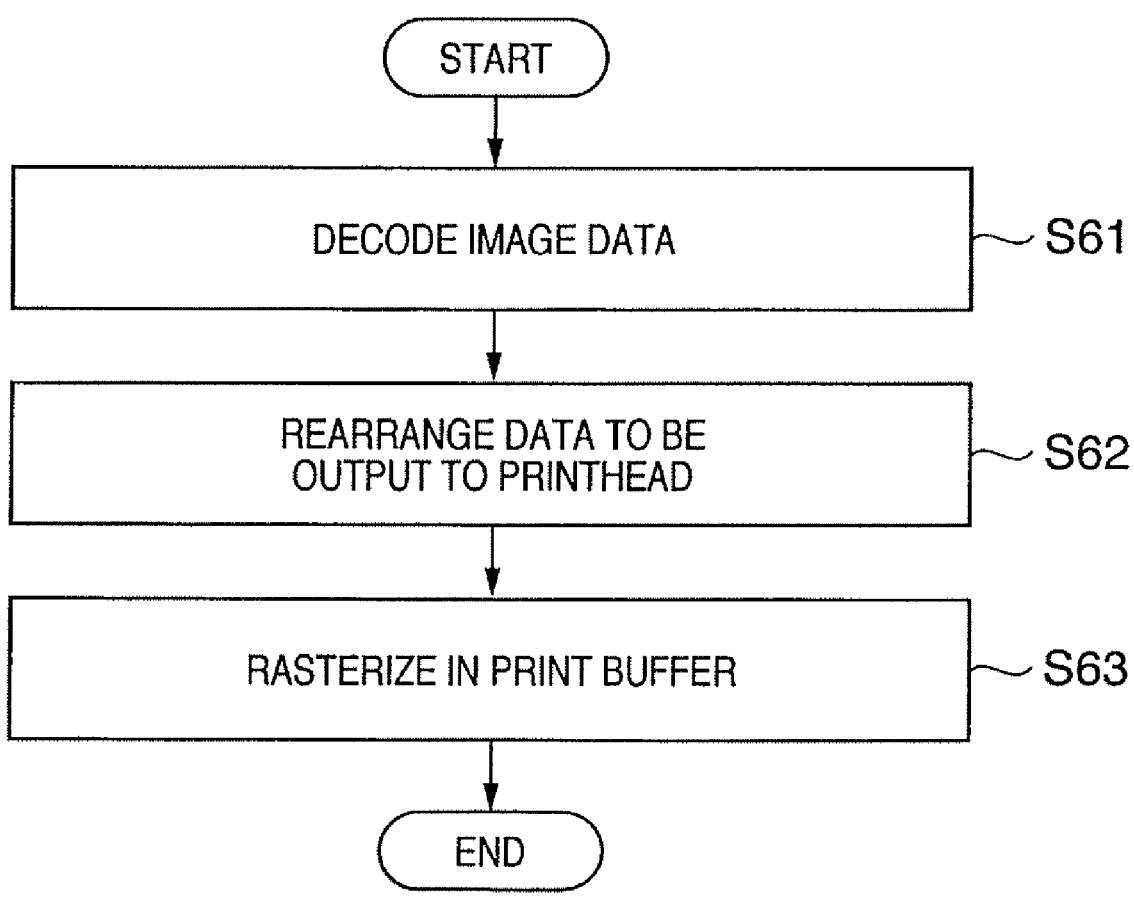

FIG. 12

|  | A | B | C | D |
|---|---|---|---|---|
| S4401 | ○ |  |  |  |
| S4402 | × | ○ |  |  |
| S4403 | ○ | × |  |  |
| S4404 | × | ○ |  |  |
| S4405 |  | × | ○ |  |
| S4406 |  |  | × | ○ |
| S4407 |  |  | ○ | × |
| S4408 |  |  | × | ○ |

IMAGE SUPPLY DEVICE, CONTROL METHOD OF THE DEVICE, AND PRINTING SYSTEM

This application is a continuation of PCT/JP2005/019409 filed Oct. 21, 2005.

TECHNICAL FIELD

The present invention relates to a printing system which has an image supply device and a printing device and causes the printing device to print an image based on image data supplied from the image supply device, the image supply device, and a control method of the device.

BACKGROUND ART

A so-called digital camera direct printing system is becoming popular, which directly connects a printer to a digital still camera (to be referred to as a DSC hereinafter) via an interface such as a USB and transmits a photo image stored in a storage medium (memory card) in the DSC to the printer to make it print the image.

In this printing system, generally, the DSC transmits the JPEG file of a print target image to the printer. The printer converts the JPEG file into a printable data format by, for example, decompression, color conversion, and resize and prints the image.

The quality of images obtained by a DSC is dramatically improving. A high-resolution DSC capable of capturing and storing image data with 8,000,000 pixels or more is also commercially available. There is proposed a system that processes an image captured by such a high-resolution DSC into print data and transmits the data to a printer to make it print the image (patent references 1 to 3).

Patent reference 1 proposes a digital camera direct printing system capable of printing an image based on image data from a DSC and a print format including the paper size in a printer by using a unique print protocol that is not so general.

In patent reference 2 aiming at reducing the process load on a printer, a DSC converts a JPEG file into a printable data format by, for example, decompression, color conversion, and resizes and transmits it to a printer, thereby reducing the image process load on the printer.

In patent reference 3, a DSC corrects variations in color reproduction characteristic between printers, converts image data into a general image file such as JPEG, and transmits it to a printer. This allows for obtaining a stable image independently of the print characteristics of a printer.

Patent reference 1: Japanese Patent Laid-Open No. 8-32911

Patent reference 2: Japanese Patent Laid-Open No. 10-290470

Patent reference 3: Japanese Patent Laid-Open No. 2003-134457

DISCLOSURE OF INVENTION

Problems that the Invention is to Solve

It has been recently realized that making a DSC partially execute the print image data generation process to distribute the image process load, as in the above-described prior arts, poses the following problems. For example, the prior arts describe that the DSC acquires, from the printer, information about a print format or print characteristics supported by the printer. However, there is no detailed description of how to acquire the information about the print characteristics of the printer by communication between the printer and the DSC. On the other hand, a printing system is known, which allows the user to arbitrarily set and select, on the DSC side, the paper size and layout for printing by the printer within the allowable range of its Capability. However, this printing system only causes the printer to transmit its supported sizes and the like. That is, the system does not always guarantee that the DSC will transmit image data suitable for the printer. In other words, even when the DSC can make print settings supported by the printer, image data required by the printer is not always appropriately set when based only on Capability sent from the printer. This is because image data actually suitable for the printer may depend on the paper size and layout selected by the user on the UI of the DSC. More specifically, the suitable orientation and size of image data change between a mode wherein one photo is laid out and printed in one page and a mode wherein two photos are laid out and printed in one page.

Particularly in patent reference 1, a print format allowable by the printer is sent to the DSC. The DSC changes the print specifications based on the format. At this time, image data is converted at the discretion of the DSC, and its image quality is not always preferable for the printing device. The DSC may excessively reduce the image data and make the quality so poor that the printer cannot execute a high quality process.

For example, if A4 sheets are set in a printer having a paper size detection function, the printer notifies the DSC of "A4" as the printable paper size. If the printer has no paper size detection function, the user selects the size of paper sheets set in the printer by using its setting panel and notifies the DSC of the result. In either case, printer specifications which are known to the printer at that point in time are transmitted from the printer to the DSC. There is no guarantee that image data sent from the DSC is suitable for the printer. This is because even in this case, image data suitable for the printer may depend on the paper size and layout selected by the user on the UI of the DSC.

Patent references 2 and 3 describe the print characteristics of a printer as being acquired from the printer. Image data to be transmitted to the printer is converted based only on the acquired print characteristics. Even when the DSC should have converted an image in accordance with the printer, the printer must execute printing using only the converted image. There is no way to allow the printer to adaptively acquire desired image data from the DSC based on print conditions or its own capability. The prior arts include no description about an image process or print process according to the desire of a DSC user who wants high-quality image printing.

None of the above-described patent references gives consideration to the memory in the image conversion process on the DSC side. For example, to lay out and print 16 photos in one page, it is necessary to convert the image data of the 16 photos and store the converted image data. This increases the load on the memory of the DSC. In the worst case, the memory cannot completely hold the converted image data so no image data can be transmitted to the printer.

It is an object of the present invention to solve the above-described problems of the prior arts.

It is a characteristic feature of the present invention to provide an image supply device which can supply image data that has undergone a predetermined image process on the image supply device to a printing device by setting the reference number of an actual image and the reference number of an image that has undergone the predetermined image process and causing the printing device to designate an image by using the reference number, a control method of the device, and a printing system.

Means of Solving the Problems

An image supply device according to an aspect of the present invention has the following arrangement. That is, there is provided an image supply device for supplying image data to a printing device, characterized by comprising:

setting means for setting a first reference number and a second reference number to, of images to be supplied to the printing device, images that require a predetermined image process and remaining images, respectively;

job issuance means for issuing a print job including a reference number of a print target image in accordance with a print instruction using the printing device;

first image supply means for supplying, to the printing device, image data which corresponds to the first reference number and has undergone the predetermined image process, in a case that the reference number of an image requested by the printing device in response to the print job issued by said job issuance means is the first reference number; and second image supply means for supplying, to the printing device, image data which corresponds to the second reference number and is read out, in a case that the reference number of an image requested by the printing device in response to the print job issued by said job issuance means is the second reference number.

A printing system according to an aspect of the present invention has the following arrangement. That is, there is provided a printing system in which an image supply device supplies image data to a printing device to print, characterized in that the image supply device comprises:

setting means for setting a first reference number and a second reference number to, of images to be supplied to the printing device, images that require a predetermined image process and remaining images, respectively;

job issuance means for issuing a print job including a reference number of a print target image in accordance with a print instruction using the printing device;

first image supply means for supplying, to the printing device, image data which corresponds to the first reference number and has undergone the predetermined image process, in a case that the reference number of an image requested by the printing device in response to the print job issued by said job issuance means is the first reference number; and second image supply means for supplying, to the printing device, image data which corresponds to the second reference number and is read out, in a case that the reference number of an image requested by the printing device in response to the print job issued by said job issuance means is the second reference number, and the printing device comprises:

image request means for requesting image data of the image supply device by using the reference number of the image included in the print job, wherein the printing device receives and prints image data transmitted from the image supply device in response to a request by said image request means.

A control method of an image supply device according to an aspect of the present invention has the following arrangement. That is, there is provided a control method of an image supply device for supplying image data to a printing device, characterized by comprising:

a setting step of setting a first reference number and a second reference number to, of images to be supplied to the printing device, images that require a predetermined image process and remaining images, respectively;

a job issuance step of issuing a print job including a reference number of a print target image in accordance with a print instruction using the printing device;

a first image supply step of supplying, to the printing device, image data which corresponds to the first reference number and has undergone the predetermined image process, in a case that the reference number of an image requested by the printing device in response to the print job issued in said job issuance step is the first reference number; and a second image supply step of supplying, to the printing device, image data which corresponds to the second reference number and is read out, in a case that the reference number of an image requested by the printing device in response to the print job issued in said job issuance step is the second reference number.

EFFECTS OF THE INVENTION

According to the present invention, a reference number of an actual image and that of an image obtained by executing a predetermined image process for the actual image are set. The printing device designates an image by using a reference number. Hence, image data obtained by executing the predetermined image process on the image supply device can be supplied to the printing device. The printing device can adaptively acquire a suitable image in accordance with the contents of print settings and the state of the printing device itself.

Further features of the present invention will become apparent from the following description of exemplary embodiments with reference to the attached drawings

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view showing an example of a "schema" as an example of Capability information transmitted from the PD printer to the DSC in step S22 in FIG. 6B;

FIG. 9 is a flowchart for explaining an image data process (step S28) by the PD printer according to the embodiment;

FIG. 12 depicts a view for explaining the order of image rotation and resized image file generation and erase according to the first embodiment;

BEST MODE FOR CARRYING OUT THE INVENTION

Preferred embodiments of the present invention will be described below in detail with reference to the accompanying drawings. The following embodiments do not limit the present invention according to claims, and not all combinations of characteristic features described in the embodiments are necessarily indispensable for the solution of the present invention. In the embodiments, direct printing implemented by a digital camera (DSC) and a printer will be exemplified. However, the present invention is not limited to this.

Figure 1:
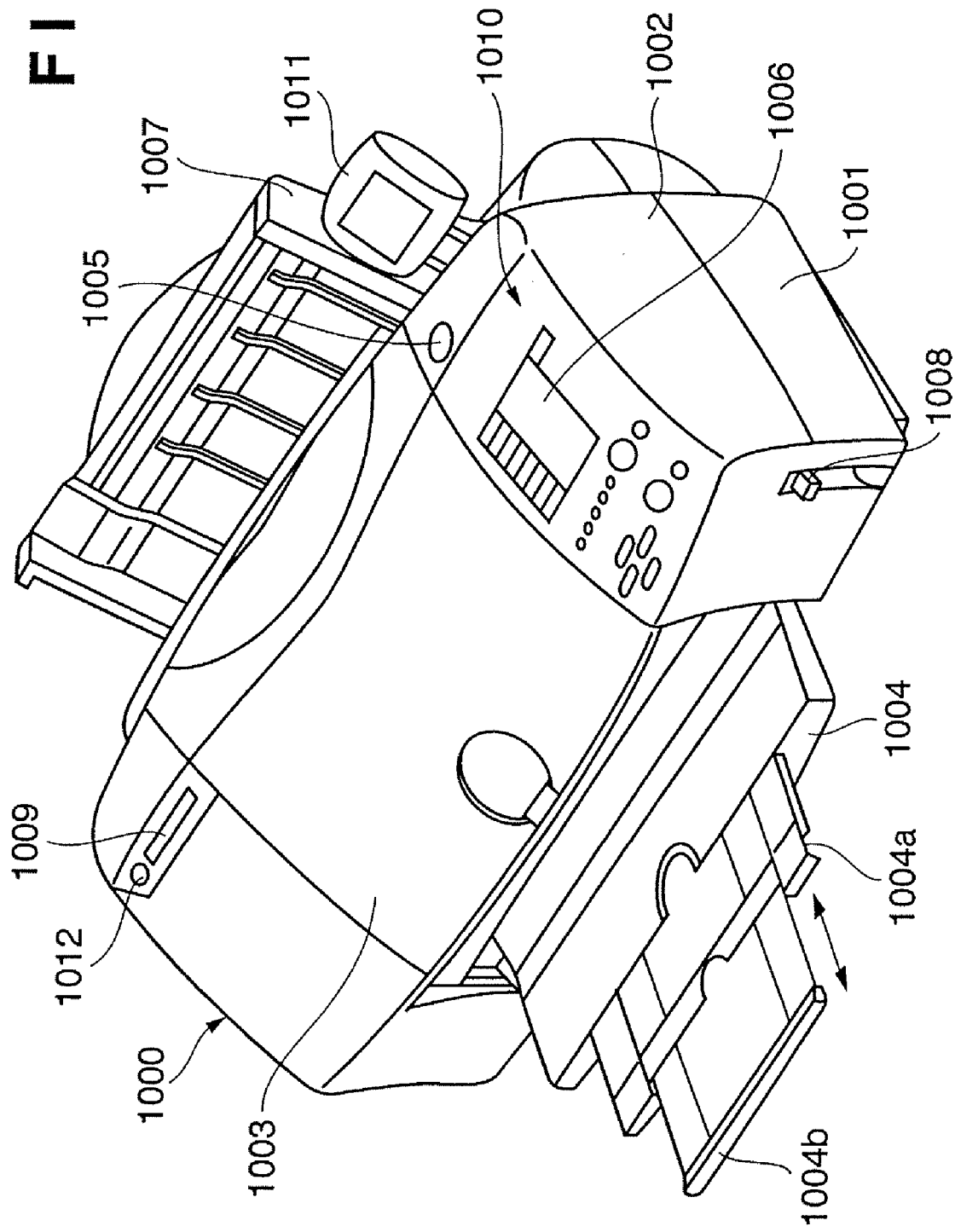
FIG. 1 depicts a schematic perspective view showing a PD printer according to an embodiment of the present invention.

FIG. 1 depicts a schematic perspective view showing a photo-direct printer device (to be referred to as a PD printer hereinafter) 1000 according to an embodiment of the present invention. The PD printer 1000 has a normal PC printer function of receiving data from a host computer (PC) and printing it, a function of directly reading and printing image data stored in a storage medium such as a memory card, and a function of receiving image data from a digital camera or PDA and printing it.

Referring to FIG. 1, the main body that forms the casing of the PD printer 1000 according to the embodiment has casing members: a lower case 1001, upper case 1002, access cover 1003, and discharge tray 1004. The lower case 1001 forms almost the lower half of the PD printer 1000, whereas the upper case 1002 forms almost the upper half of the main body. These cases combine and form a hollow structure with a storage space to store mechanisms (to be described later). The upper and front surfaces have openings. The lower case 1001 rotatably holds the discharge tray 1004 at one end. As the discharge tray 1004 rotates, the opening in the front surface of the lower case 1001 opens/closes. Upon printing, the discharge tray 1004 rotates to the front side and opens to discharge printed sheets (including normal paper, dedicated paper, and resin sheets, all of which will simply be referred to as sheets hereinafter) from the opening and sequentially stack the discharged sheets. The discharge tray 1004 houses two auxiliary trays 1004a and 1004b. The sheet support area can be increased/reduced in three steps by pulling out the trays to the front side, as needed.

The upper case 1002 holds the access cover 1003 at one end so as to open/close the opening formed in the upper surface. Opening the access cover 1003 enables exchanging a printhead cartridge (not shown), ink tank (not shown), or the like stored in the main body. A projection (not shown) formed on the back surface of the access cover 1003 rotates a cover opening/closing lever when the access cover 1003 opens/closes. The lever rotation position is detected by, for example, a microswitch to detect the open/closed state of the access cover 1003.

The upper case 1002 has a power key 1005 on its upper surface. The upper case 1002 has, on its right side, an operation panel 1010 with a liquid crystal display unit 1006 and various kinds of key switches. The structure of the operation panel 1010 will be described later in detail with reference to FIG. 2. An automatic feeder 1007 automatically feeds sheets into the device main body. A paper interval selection lever 1008 adjusts the interval between the printhead and sheets. A card slot 1009 receives an adapter capable of mounting a memory card. The printer can directly receive, via the adapter, image data stored in the memory card and print it. Examples of the memory card (PC) are a compact Flash® memory, smart media, and memory stick. A viewer (liquid crystal display unit) 1011 is detachable from the main body of the PD printer 1000. The viewer 1011 displays every frame image or index images when the user wants to search for a print target from images stored in the PC card. A USB terminal 1012 connects a digital camera (to be described later). The PD device 1000 has, on its back surface, a USB connector 1013 (FIG. 3) to connect a personal computer (PC).

Figure 2:
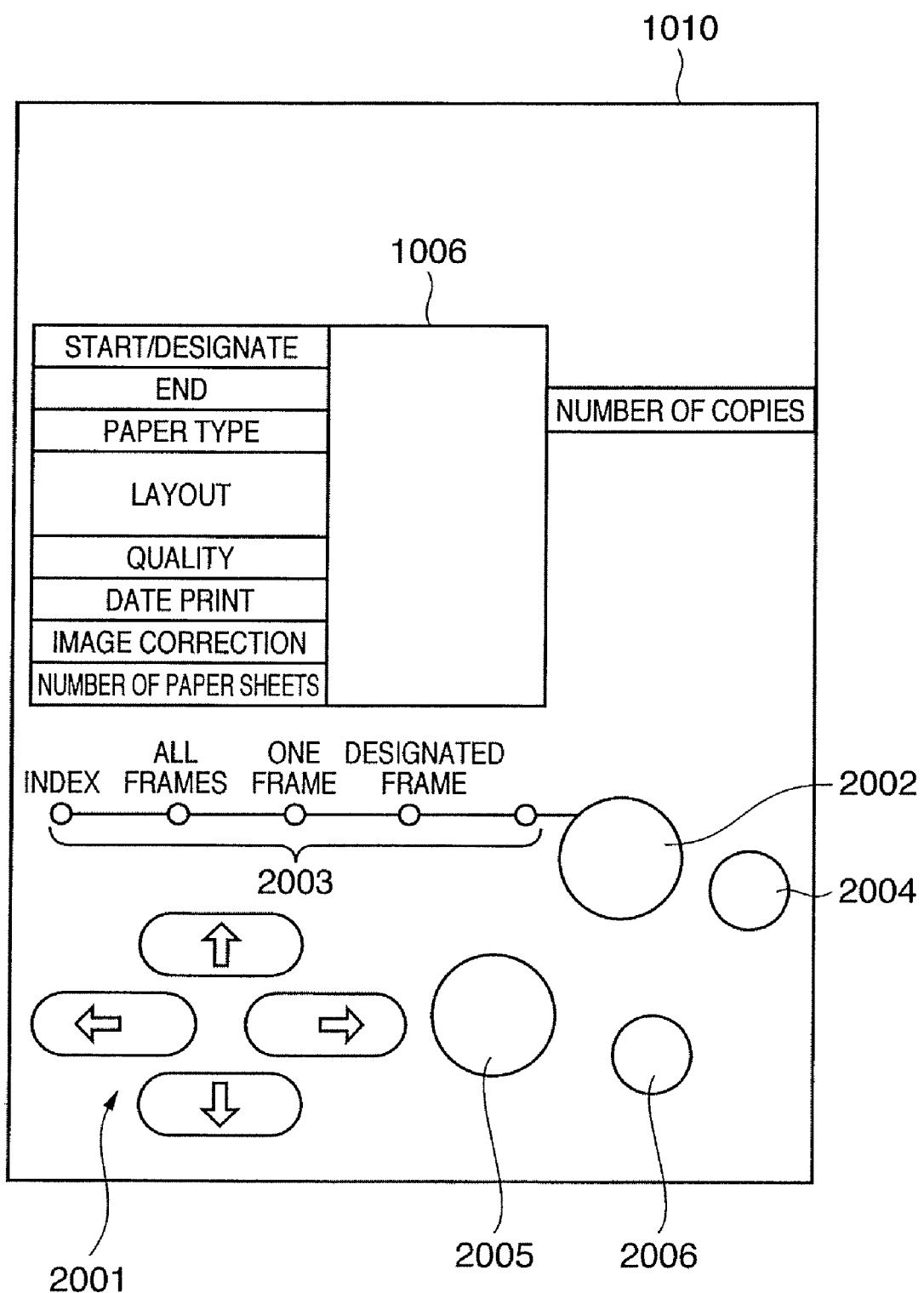
FIG. 2 depicts a schematic view showing the operation panel of the PD printer according to the embodiment.

FIG. 2 depicts a schematic view showing the operation panel 1010 of the PD printer 1000 according to the embodiment.

Referring to FIG. 2, the liquid crystal display unit 1006 displays menu items to set various data about items printed on its right and left sides. Examples of the displayed items are the number of the first photo image to be printed in a plurality of photo image files, the designated frame number (start frame designation/print frame designation), the number of the last photo image to be printed (end), the number of prints (number of copies), the type of sheets used for print (paper type), a setting of the number of photos to be printed on one sheet (layout), designation of print quality (quality), designation of ON/OFF of image capturing date print (date print), designation of ON/OFF of photo correction print (image correction), and a display of the number of paper sheets necessary for print (number of paper sheets). The user selects or designates these items by using cursor keys 2001. The user can switch the type of print (e.g., index print, all frame print, one frame print, and designated frame print) by pressing a mode key 2002. One of LEDs 2003 lights up in correspondence with the selected mode. A maintenance key 2004 is used for printer maintenance to, for example, clean the printhead. The user presses a print start key 2005 to give the instruction for the start of print or establish maintenance settings. The user presses a print stop key 2006 to stop print or give the instruction to stop maintenance operation.

The arrangement of the main part related to control of the PD printer 1000 according to the embodiment will be explained next with reference to FIG. 3. The same reference numerals as in the foregoing drawings denote the same parts in FIG. 3, and a description thereof will be omitted.

Figure 3:
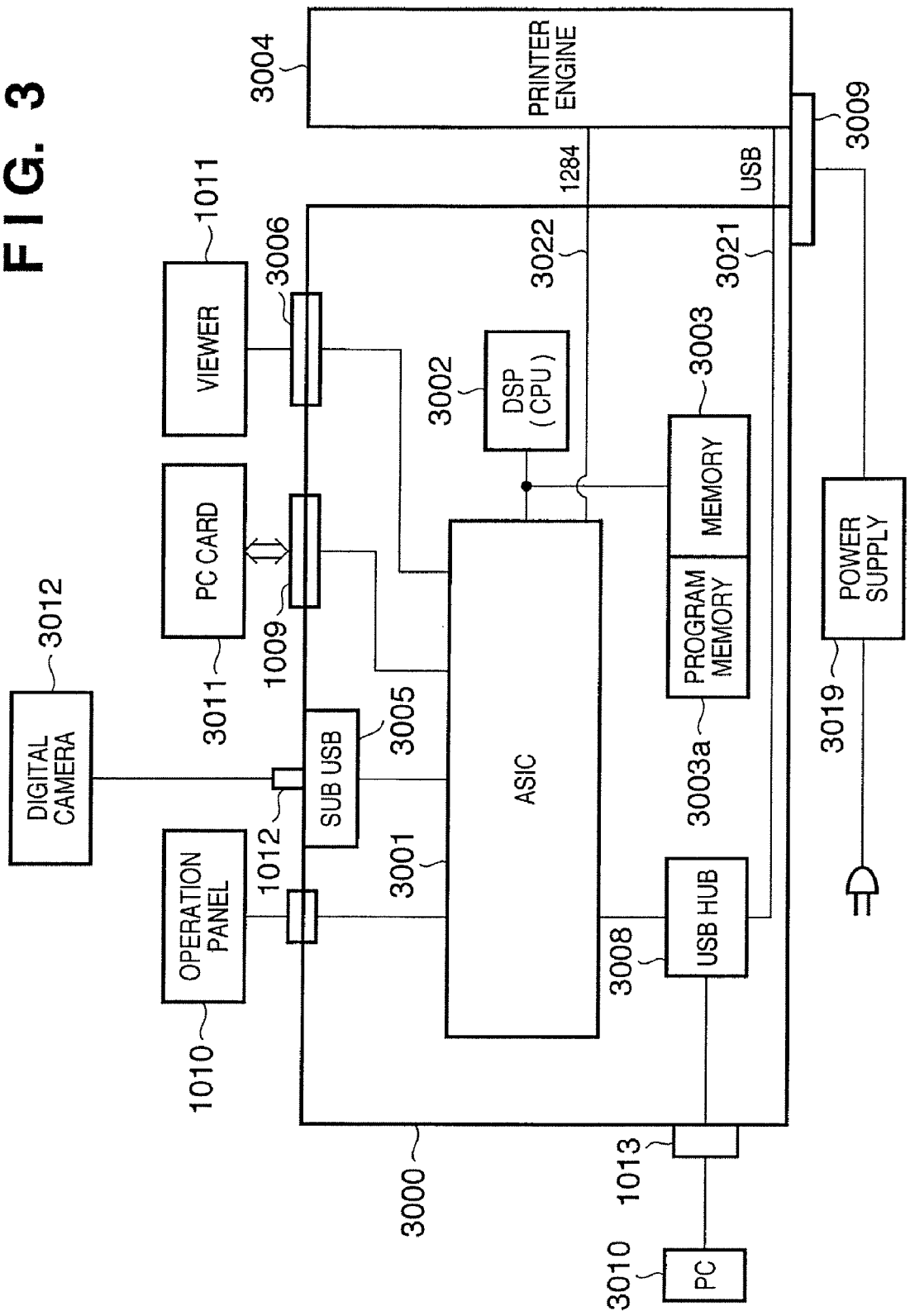
FIG. 3 is a block diagram showing the arrangement of the main part related to control of the PD printer according to the embodiment.

FIG. 3 is a block diagram showing the arrangement of the main part related to control of the PD printer according to the embodiment.

In FIG. 3, reference numeral 3000 denotes a controller (control board) and reference numeral 3001 denotes an ASIC (Application Specific Integrated Circuit). A DSP (Digital Signal Processor) 3002 incorporates a CPU and performs various kinds of control processes to be described later, and image processes such as conversion from a luminance signal (RGB) to a density signal (CMYK), scaling, gamma conversion, and error diffusion. A memory 3003 has a program memory 3003a to store the control program of the CPU of the DSP 3002, a RAM area to store programs in running, and a memory area functioning as a work memory to store, for example, image data. A printer engine 3004 here includes an ink-jet printer engine that prints a color image by using a plurality of color inks. A USB connector 3005 serves as a port to connect a digital camera (DSC) 3012. A connector 3006 connects the viewer 1011. A USB hub (USBHUB) 3008 passes through data from a PC 3010 and outputs it to the printer engine 3004 via a USB 3021 when the PD printer 1000 prints based on image data from the PC 3010. The connected PC 3010 can directly exchange data and signals with the printer engine 3004 and execute print (functions as a general PC printer). A power connector 3009 receives, from a power supply 3019, a DC voltage converted from a commercial AC voltage. The PC 3010 is a general personal computer. Reference numeral 3011 denotes a memory card (PC card) described above, and reference numeral 3012, the digital camera (DSC: Digital Still Camera).

Signal exchange between the controller 3000 and the printer engine 3004 is performed via the above-described USB 3021 or an IEEE1284 bus 3022.

<Explanation of Outline of Digital Camera>

Figure 4:
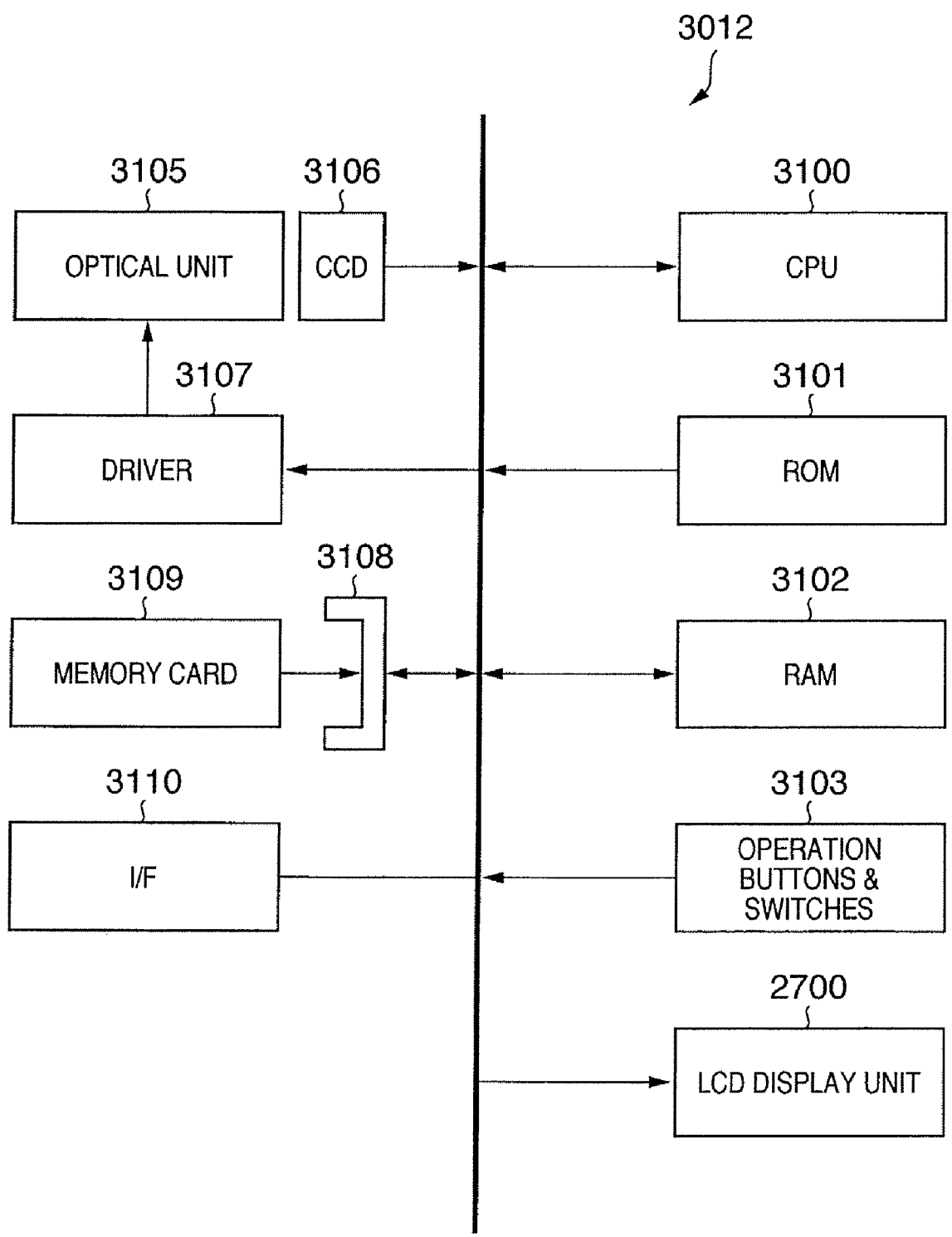
FIG. 4 is a block diagram showing the arrangement of a DSC according to the embodiment.

FIG. 4 is a block diagram showing the arrangement of the DSC (digital camera) 3012 according to the embodiment.

Referring to FIG. 4, a CPU 3100 controls the entire DSC 3012. A ROM 3101 stores the process procedure of the CPU 3100. A RAM 3102 serves as the work area of the CPU 3100. Switches 3103 to execute various kinds of operations include a shutter switch, mode change-over switch, selection switch, and cursor keys. A liquid crystal display unit 2700 is used to display an image that is currently being captured or an image captured and stored in a memory card, or display menus for various kinds of settings. An optical unit 3105 mainly has a lens and its driving system. Reference numeral 3106 denotes a CCD element. A driver 3107 drives and controls the optical unit 3105 under the control of the CPU 3100. A connector 3108 connects a storage medium 3109 (e.g., compact Flash® memory card or smart media). A USB interface (slave side of USB) 3110 connects to a PC or the PD printer 1000 of the embodiment.

<Explanation of Outline of Direct Printing>

Figure 5:
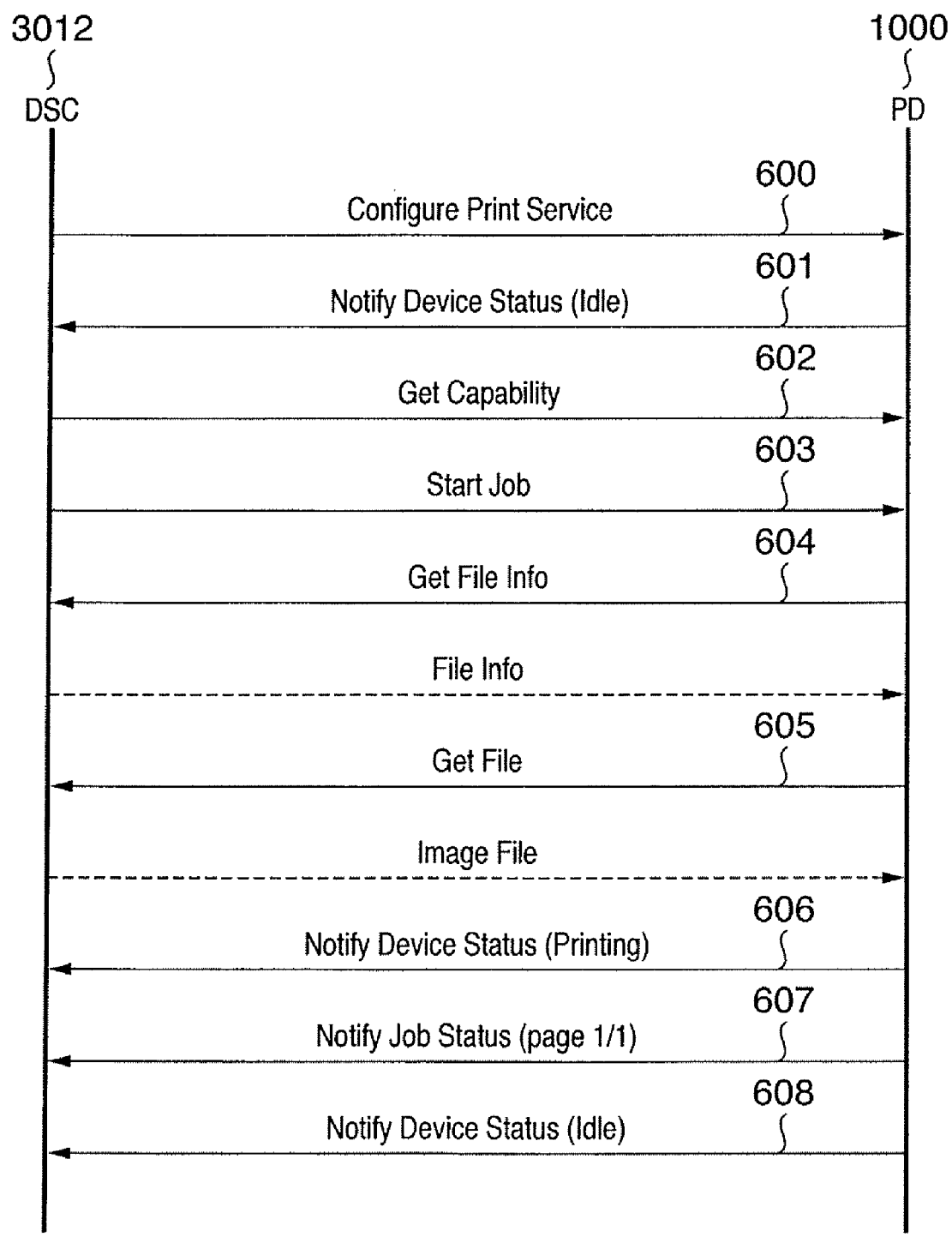
FIG. 5 is a sequence chart for explaining a rough signal flow, in a case that a DSC issues a print request to a PD printer to execute printing in a printing system according to the embodiment.

FIG. 5 is a sequence chart for explaining a rough signal flow when the DSC 3012 issues a print request to the PD printer 1000 to execute printing in the above-described printing system according to the embodiment.

This process procedure is executed after the PD printer 1000 and DSC 3012 connect to each other via a USB cable or mutually confirm by wireless communication that they comply with DPS specifications. First, the DSC 3012 transmits "ConfigurePrintService" to the PD printer 1000 to confirm the state of the PD printer 1000 (600). The PD printer 1000 returns its state ("idle" state) at that point in time (601). Since the PD printer 1000 is in the "idle" state, the DSC 3012 inquires the PD printer 1000 of its Capability (602) and issues a print start request (StartJob) corresponding to Capability (603). The DSC 3012 issues the print start request to the PD printer 1000 under the condition that "newJobOK" in status information (to be described later) from the PD printer 1000 is "True" in 601.

In response to the print start request, the PD printer 1000 requests, based on the file ID of image data as a print instruction target, file information as various kinds of attribute information including a file name and an image capturing date/time of the DSC 3012 (GetFileInfo) (604). In response to this request, the DSC 3012 transmits file information (FileInfo). The file information contains information of, for example, a file capacity. Upon receiving the file information and determining that the file is processable, the PD printer 1000 requests the file information of the DSC 3012 (GetFile) (605). The DSC 3012 sends the image data (ImageFile) of the requested file to the PD printer 1000. The PD printer 1000 starts a print process and sends status information indicating "Printing" to the DSC 3012 by "NotifyDeviceStatus" in 606.

When the print process of one page is ended, the PD printer 1000 notifies the DSC of it by "NotifyJobStatus" 607 at the start of process of the next page. If the number of print target pages is only one, and the print-requested page is printed, the PD printer 1000 notifies the DSC that the PD printer 1000 is set in the "idle" state by "NotifyDeviceStatus" 608 (NotifyDeviceStatus (Idle)).

In, for example, N-up printing for laying out and printing a plurality of (N) images in one page, the PD printer 1000 sends the "NotifyJobStatus" 607 to the DSC 3012 every time N images are printed. The issue timings of "NotifyJobStatus" and "NotifyDeviceStatus" and the image data acquisition timing of this embodiment are merely examples. Various cases can occur depending on implementation of the product.

Figure 6A:
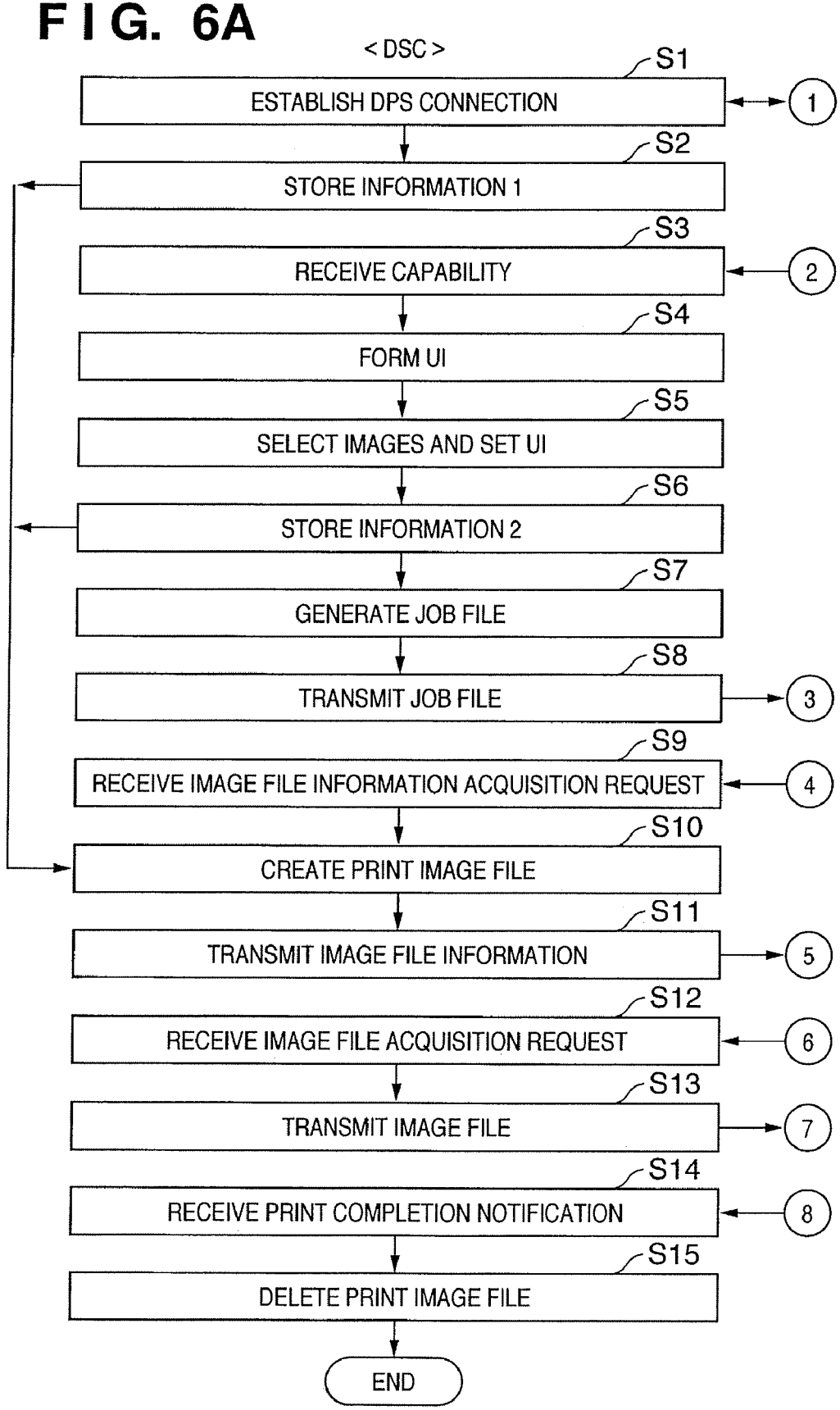
FIGS. 6A and 6B are flowcharts for explaining a process of executing communication between a digital camera (DSC) and a PD printer according to the first embodiment of the present invention to supply image data from the DSC to the printer and execute printing.
Figure 6B:
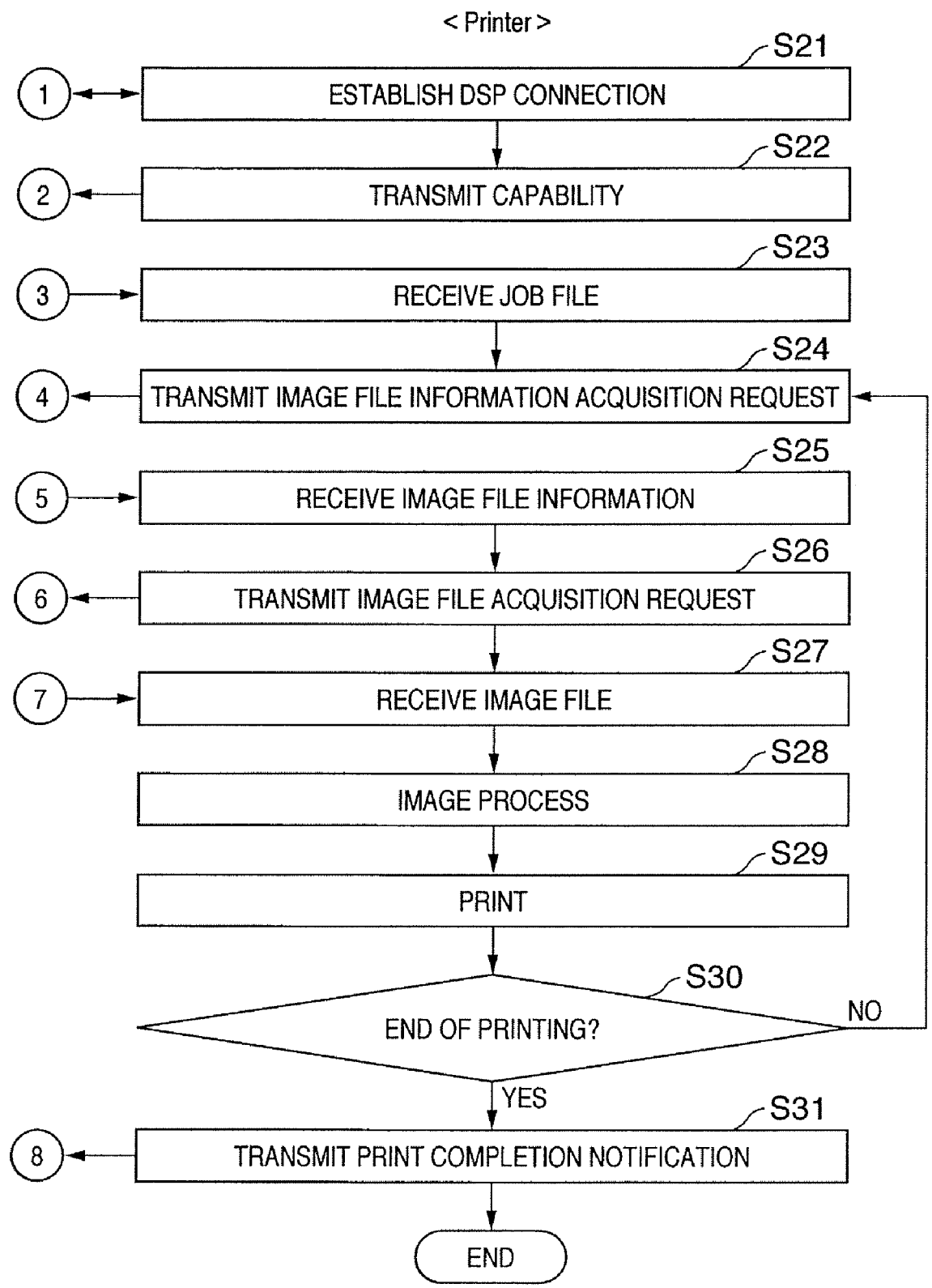

FIGS. 6A and 6B are flowcharts for explaining a process of executing communication between the digital camera (DSC) 3012 and the PD printer 1000 according to the embodiment of the present invention to supply image data from the DSC 3012 to the PD printer 1000 and execute printing. Referring to FIGS. 6A and 6B, steps S1 to S15 indicate the process of the DSC 3012, and steps S21 to S31 indicate the process of the PD printer 1000.

In steps S1 and S21, the DSC 3012 and PD printer 1000 mutually confirm that they comply with the DPS specifications. In this state, the DSC 3012 inquires the PD printer 1000 of the printer state and device information. The PD printer 1000 notifies the DSC of its state and device information at that point in time. The device information includes, for example, the version of the connection protocol and the vender name and model name of the printer. In step S2, the DSC 3012 stores, in the RAM 3102, necessary "information 1" of the printer state and device information. The "information 1" contains information that is necessary for the DSC 3012 to convert an image file at a later time. Next, the DSC 3012 requests Capability of the PD printer 1000, as indicated by 602 in FIG. 5.

In step S22, the PD printer 1000 creates capability information (Capability) about its print function and transmits it to the DSC 3012. The DSC 3012 receives Capability (step S3). In step S4, the DSC 3012 forms a UI based on Capability and displays it on the display unit 2700. For example, assume that A4 and B5 are available as paper sizes, the PD printer 1000 has plain paper and photo paper, and "framed" or "frameless" 1-up, 2-up, or 4-up layout print is possible. If date print is also possible, the display unit 2700 displays a UI window that allows the user to arbitrarily select the items and inhibits selection of other items.

In step S5, the user of the DSC 3012 selects images to be printed by referring to the formed UI window and sets the print format of the images. The print format of images is set based on Capability of the PD printer 1000 received in step S3, including the number of pages to be printed, paper size, layout, and ON/OFF of date print. In step S6, "information 2" thus set by the user is stored in the RAM 3102. The "information 2" contains the information of the paper size and layout set by the user using the UI.

When the user gives the instruction for the start of printing by using the UI, the process advances to step S7 to create a print job file to instruct printing. In step S8, the DSC 3012 transmits the created print job file to the PD printer 1000. In step S23, the PD printer 1000 receives the print job file. In step S24, the PD printer 1000 analyzes the received print job file and prepares for printing. The PD printer 1000 issues an "image file information acquisition request" (image file name) of the print target described in the print job file to the DSC 3012.

In, for example, a service that is operated by a PTP (Picture Transfer Protocol) on a USB, the "image file information acquisition request" corresponds to "GetObjectInfo" defined by the PTP. However, the role of the "image file information acquisition request" of this embodiment is to transmit an image file creation timing from the PD printer 1000 to the DSC 3012. In this embodiment, the "image file information acquisition request" is used as the means for transmitting the creation timing. However, the means is not limited to this. Any other dedicated command or an existing communication command may be used. As a characteristic feature of this embodiment, the PD printer 1000 notifies the DSC 3012 of the timing of "print image file creation".

In step S9, the DSC 3012 receives the "image file information acquisition request". The process advances to step S10 to execute a process of creating a print image file to be transmitted to the PD printer 1000 as a characteristic feature of this embodiment. The process in step S10 will be described later in detail. In step S11, the DSC 3012 transmits the information (ObjectInfo Dataset: including attribute information such as the image file name, data size, directory, and date) of the created print image file to the PD printer 1000.

In step S25, the PD printer 1000 receives the information of the print image file. The PD printer 1000 transmits, to the DSC 3012, a request to acquire the designated print image file itself (step S26). Upon receiving the image file acquisition request (step S12), the DSC 3012 transmits the requested print image file to the PD printer 1000 in step S13.

In step S27, the PD printer 1000 receives the print image file. In step S28, the image data of the received image file is decoded and subjected to an image process to convert the data into an image with a format that can be output by the PD printer 1000. In step S29, the PD printer 1000 prints based on the converted image data. In step S30, it is determined whether the image data is completely printed. If printing is not completed, for example, the PD printer 1000 may be unable to ensure a sufficient buffer area to store the received image data and may have divisionally received and processed the image data of the image file in step S27. In such a case, the process returns to step S24 to transmit the "image file information acquisition request" to the DSC 3012 again. In step S27, the partial data of the image data of the image file is received and printed in accordance with the same procedure as described above.

If the image data of the image file is completely printed in step S30, the process advances to step S31 to notify the DSC 3012 of the completion of printing of the image file.

Upon receiving the print completion notification, the DSC 3012 deletes the print image file created in step S10 from the RAM 3102 (step S15) and finishes the process. The original image file in the memory card 3109 is kept saved.

If the amount of the acquired image data is insufficient in step S29 described above and, for example, if the data amount is smaller than that printed by one cycle of scanning of the printhead, the image process in step S28 is possible though the print process in step S29 is impossible. In this case, the determination in step S30 is done without executing the print operation in step S29, and the process returns to step S24.

After the image file is created in step S10, the DSC 3012 transmits the "image file information" to the PD printer 1000 in step S11. This is a reply to the "image file information acquisition request" (GetObjectInfo) (step S24) from the PD printer 1000 in step S24 described above. The "image file information" also has a role to notify the PD printer 1000 of completion of the image file conversion and creation process by the DSC 3012, like the above-described "image file information acquisition request". Hence, instead of using transmission of the "image file information" in this embodiment, any other dedicated command or an existing communication command may be used.

FIG. 7 depicts a view showing an example of a "schema" as an example of Capability information transmitted from the PD printer 1000 to the DSC 3012 in step S22 in FIG. 6B.

The schema describes paper sizes (paperSizes) usable by the PD printer 1000.

"<paperSizes>80010000 80010001 80010002" indicated by reference numeral 700 in FIG. 7 is paper size information. The PD printer 1000 of this embodiment can print by using paper sheets of three sizes, that is, "A4", "L", and "2L". The three 8-digit number strings "80010000", "80010001", and "80010002" indicated by reference numeral 700 correspond to the paper sizes "A4", "L", and "2L", respectively. The correspondence between the number strings and the paper sizes is set in advance between the PD printer 1000 and the DSC 3012. The DSC 3012 can know the paper sizes usable for printing by the PD printer 1000 by receiving the schema.

Figure 8:
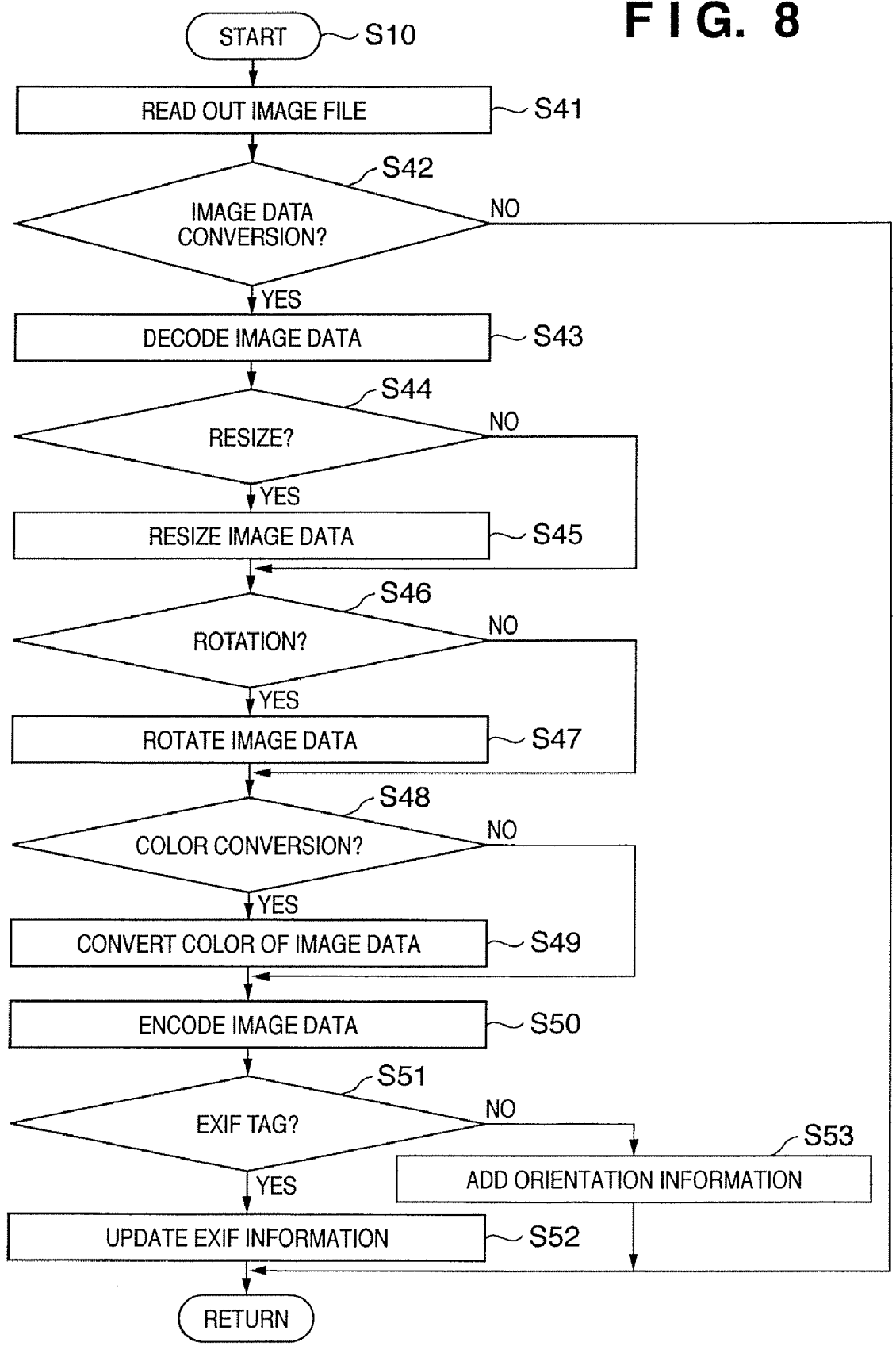
FIG. 8 is a flowchart for explaining an image file creation process (step S10) by the DSC according to the embodiment.

FIG. 8 is a flowchart for explaining the image file creation process (step S10) by the DSC according to the embodiment.

In step S41, the DSC 3012 reads out the image data of the process target image file stored in the memory card 3019. In step S42, it is determined whether the process such as resize (reduction), rotation, and color conversion is necessary for the image data. For example, the resolution and memory capacity of the PD printer 1000 are acquired based on "information 1" stored in the RAM 3102 in step S2 described above. In addition, the resolution and size of the image to be actually printed are acquired based on "information 2" stored in step S6. It is then determined whether the process is necessary for the print target image data. For example, assume that the resolution of the image data of the original image file is 8,000,000 pixels, the print resolution of the PD printer 1000 is 720 dpi, and the size of the image to be printed is about 3×5 cm. In this case, it is determined that the DSC 3012 should reduce (resize) the image data and then transmit it to the PD printer 1000, instead of directly transferring the original image data having 8,000,000 pixels. In addition, it is determined based on the print mode of the PD printer 1000 whether rotation and color conversion of the image data are necessary.

If it is determined in step S42 that the original image data requires certain conversion, the process advances to step S43. Otherwise, the process is ended without any operation.

The original image file is encoded by, for example, JPEG. In step S43, the data is converted into raw image data by decoding. In step S44, it is determined whether resize of the image is necessary. If the result is YES in step S44, the process advances to S45 to reduce the image data. After step S45 is executed, or if it is determined in step S44 that resize of the image is unnecessary, the process advances to step S46 to determine whether rotation of the image is necessary. If the result is YES in step S46, the image data is rotated in step S47, and the process advances to step S48. Otherwise, the process directly advances to step S48. In step S48, it is determined whether color conversion of the image data is necessary. If the result is NO in step S48, the process advances to step S50. If the result is YES in step S48, color conversion of the image data is executed in step S49, and the process advances to step S50.

In step S50, the processed image data is encoded by JPEG again. The process advances to step S51 to check whether the image data has an "EXIF" tag. If the result is YES in step S51, the "EXIF" tag is updated in step S52 in accordance with the contents of conversion in step S45, S47, and S49. If the image data has no "EXIF" tag in step S51, the process advances to step S53 to add, for example, orientation information representing the orientation of the image and necessary information including the image size after conversion to the image data as an "EXIF" tag.

A detailed example of the process in step S52 will be described. An image orientation (tag number "274": Orientation) is defined as appendix information of TIFFRev.6.0 used in EXIF. In this information, "1" (default) defines that "the 0th row is located on the upper edge of the image when observed with eyes, and the 0th column is located on the right left edge of the image when observed with eyes". When an image whose orientation is defined as "1" rotates by 90° counterclockwise, the image orientation of the "EXIF" tag of the image changes to "8", that is, "the 0th row is located on the left edge of the image when observed with eyes, and the 0th column is located on the lower edge of the image when observed with eyes". For details of the "EXIF" tag, see the "digital still camera image format standard (Exit)" in the JEIDA standard.

In the above description, the DSC 3012 acquires the "information 1" such as the device information of the printer. The DSC 3012 also acquires the "information 2", that is, information set by the camera user based on the UI corresponding to the functions of the printer and stores the information in the memory. The DSC 3012 can create print target image data based on these pieces of information and transmit it to the printer. Hence, the image data to be transmitted from the camera to the printer can obtain an amount and format corresponding to the print conditions in the printer. This reduces the load required for the image data process in the printer and also decreases the memory capacity used by the printer for the image data process. Additionally, the time required for image data transmission can be shortened because the image data can be reduced in advance in accordance with printing by the printer and transmitted to the printer.

FIG. 9 is a flowchart for explaining the image data process (step S28 in FIG. 6B) by the PD printer 1000 according to the embodiment.

In step S61, the PD printer 1000 decodes the image data received from the DSC 3012. In step S62, in order to output the decoded data to the printhead (inkjet head) of the printer engine 3004, the image data is rearranged. In step S63, the rearranged data is rasterized in the print buffer (provided in the memory 3003).

As described above, according to the embodiment, the image data process by the PD printer 1000 need not include resize, rotation, and color conversion of the image data. For this reason, the image process by the PD printer 1000 is simple, and the load on the PD printer 1000 can be reduced.

The embodiments of the present invention will be described below in detail based on the above-described technique.

First Embodiment

Figure 10A:
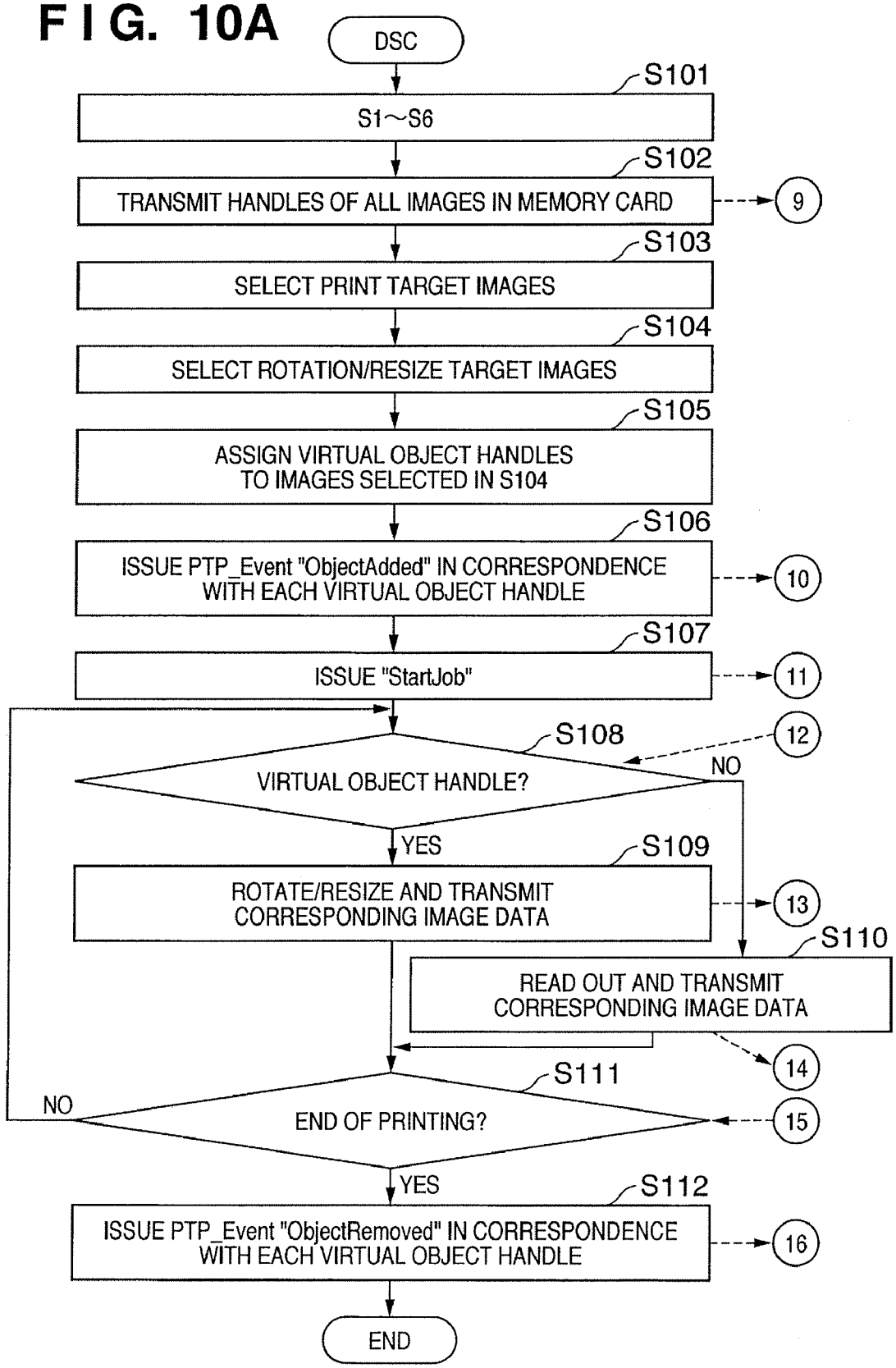
FIGS. 10A and 10B are flowcharts for explaining the processes of the DSC and PD printer in a printing system according to the first embodiment of the present invention.
Figure 10B:
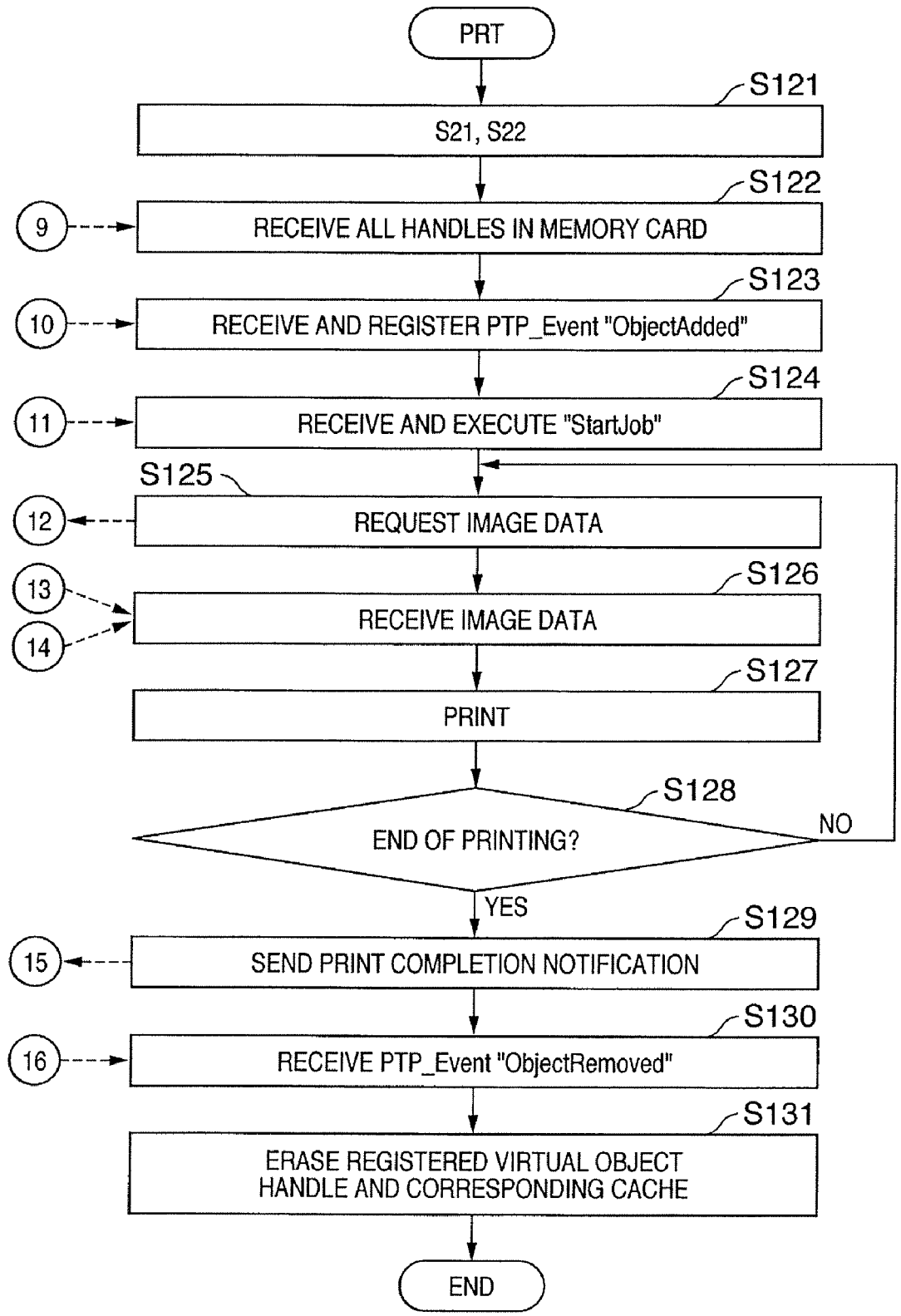

FIGS. 10A and 10B are flowcharts for explaining the processes of a DSC 3012 and a PD printer 1000 in a printing system according to the first embodiment of the present invention. In the first embodiment, when the DSC 3012 executes a process such as rotation or resize, a print job that designates a process target image by a virtual object handle is issued and printed. Referring to FIGS. 10A and 10B, the DSC 3012 executes the process in steps S101 to S112, and the PD printer 1000 executes the process in steps S121 to S131. The programs to cause the DSC 3012 and PD printer 1000 to execute the processes are stored in a ROM 3101 of the DSC 3012 and a program memory 3003a of the PD printer 1000, respectively. Step S101 corresponds to the process in steps S1 to S6 in FIG. 6A. Step S121 corresponds to the process in steps S21 and S22 in FIG. 6B. In the following explanation, the DSC 3012 executes rotation and resize of an image as an image process. However, the present invention is not limited to this. The process may further include, for example, color conversion of an image.

In step S102, the DSC 3012 transmits, to the PD printer 1000, the list of the real object handles of all images stored in a memory card 3109. In step S122, the PD printer 1000 receives the list and grasps all images stored in the memory card 3109 of the DSC 3012 as the communication partner.

In step S103, a user selects print target images from all images stored in the memory card 3109 by using the UI of the DSC 3012. In step S104, the user selects images that require rotation and/or resize from the selected print target images. This selection may be done automatically. In this case, whether rotation or resize is necessary is determined by using any of the above-described selection criteria by, for example, referring to the aspect ratio of each image and that of a print paper sheet. In step S105, a virtual object handle is assigned to each image selected in step S104 as a rotation/resize target. A virtual object handle is a new object handle that is not assigned to, for example, a file in the memory card 3109. In step S106, the DSC 3012 issues PTP_Event "ObjectAdded" to the PD printer 1000 in correspondence with each of the object handles that are set as virtual object handles. "ObjectAdded" notifies the PD printer 1000 of the existence of a virtual object handle except the object handle transmitted in step S102. In step S123, the PD printer 1000 receives "ObjectAdded" and registers the virtual object handle. This makes it possible to designate the image by using the virtual object handle in the subsequent process.

In step S107, the DSC 3012 issues a print job (StartJob) to the PD printer 1000. The print job includes the real object handles and virtual object handles based on the user selection process using the UI in steps S103 and S104. StartJob designates not a virtual object handle but a real object handle for an image that requires no rotation and/or resize.

In step S124, the PD printer 1000 receives the print job and starts executing it. In step S125, the PD printer 1000 requests the image data contained in the print job of the DSC 3012 by using each object handle (GetObjectInfo and GetObject).

Upon receiving the request, the DSC 3012 checks in step S108 whether the object handle of the requested image is a virtual object handle. If the object handle is a virtual object handle, the process advances to step S109 to read out and decode image data having a real object handle corresponding to the virtual object handle. Then, the image data is resized and/or rotated. The resized and/or rotated image data is encoded and transmitted to the PD printer 1000. The rotation and resize process executed by the DSC 3012 is the same as in FIGS. 6A, 6B and FIG. 8, and a description thereof will be omitted.

If the received object handle is a real object handle in step S108, the process advances to step S110 to read out image data corresponding to the real object handle and transmit the data to the PD printer 1000. When step S109 or S110 is executed, the process advances to step S111 to check whether a print completion notification is received from the PD printer 1000. If printing is not ended yet, the process returns to step S108 to wait for reception of the next image request. If a print completion notification is received in step S111, the process advances to step S112 to issue PTP_Event "ObjectRemoved" in correspondence with each virtual object handle. This erases the virtual object handles unique to the print job and data added to them, which are registered in the PD printer 1000.

On the other hand, the PD printer 1000 requests the image data in step S125 and receives the image data transmitted from the DSC 3012 (in step S109 or S110) in step S126. In step S127, the image data is decoded, rasterized to print data, and printed. In step S128, it is determined whether all images contained in the print job are printed. If the result is NO in step S128, the process returns to step S125 to execute the above-described process. If printing is ended in step S128, the process advances to step S129 to notify the DSC 3012 of completion of printing. In step S130, PTP_Event "ObjectRemoved" is received. The process advances to step S131 to erase the virtual object handles registered in step S123. If image data are cached in correspondence with the virtual object handles, the cached image data are erased.

As described above, according to the first embodiment, the DSC 3012 issues a print job in which actual image data is specified by a real object handle while an image to be subjected to rotation and/or resize by the DSC 3012 is specified by a virtual object handle. Upon receiving an image request from the PD printer 1000, the DSC 3012 can determine whether each image data requires rotation and/or resize and execute a suitable process.

Figure 11:
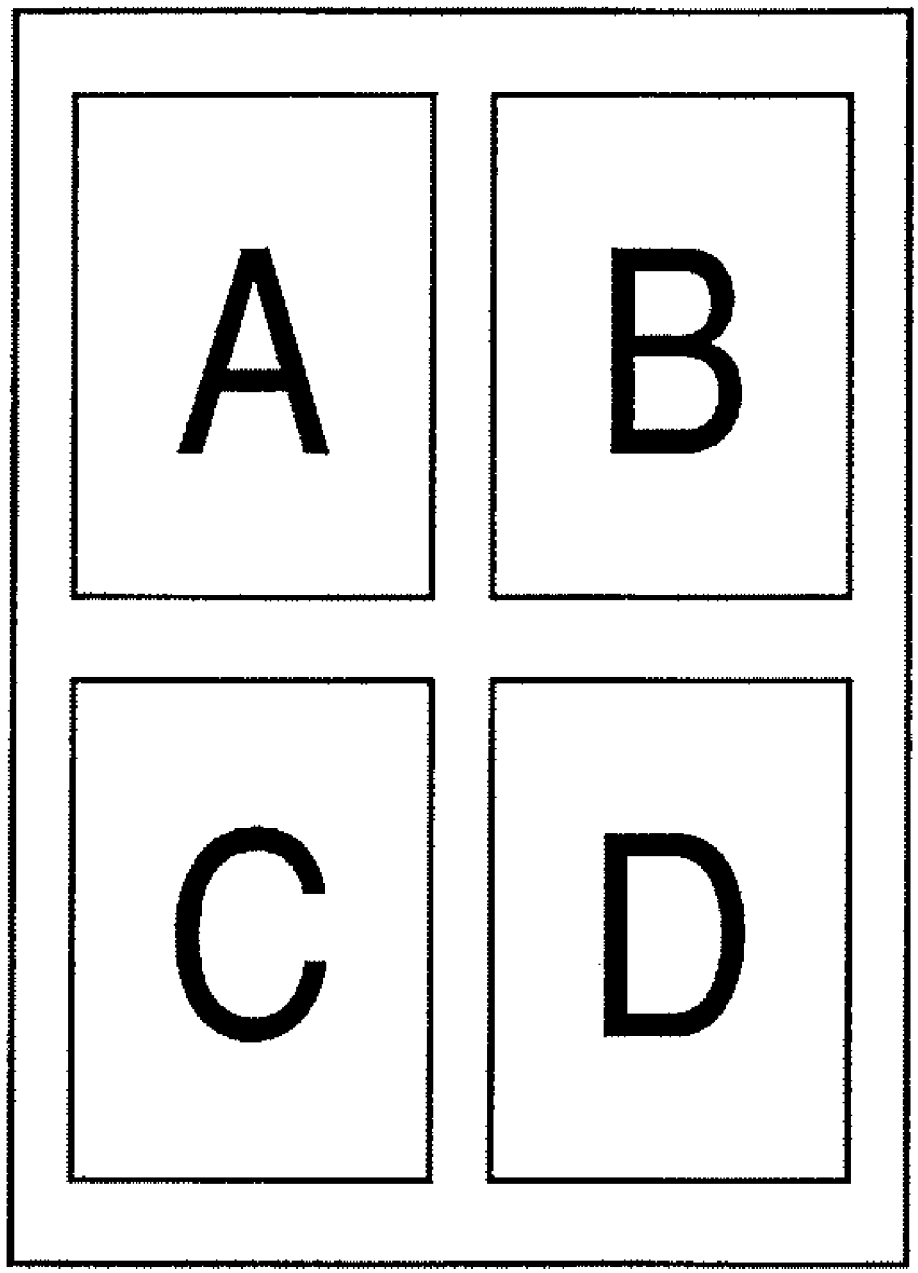
FIG. 11 depicts a view for explaining an example of print layout according to the first embodiment of the present invention.

FIG. 11 depicts a view for explaining an example of print layout to be printed by the printing system according to the first embodiment of the present invention. In the first embodiment, four images A to D are printed on one paper sheet.

The images A to D are different images, all of which are recorded in the memory card 3109 in a landscape format. In printing the images A to D, an instruction is issued to print them in a portrait format. Hence, all the images A to D require rotation. According to the above-described first embodiment, a virtual object handle is assigned to each of the images A to D in step S105 in FIG. 10A.

FIG. 12 depicts a view for explaining generation and disappearance of rotation and/or resize image files in the PD printer 1000 according to the first embodiment.

The DSC 3012 according to this embodiment can rotate and/or resize one image by using a memory 3102. To rotate and/or resize another image data, image data generated immediately before must be erased from the memory 3102. In step S4401 in FIG. 12, a rotated image of the image A is generated in response to a request from the PD printer 1000. In FIG. 12, "○" indicates that the image is generated. In step S4402, a rotated image of the image B is generated in response to a request from the PD printer 1000. At this time, the rotated image data of the image A generated in step S4401 is erased from the memory 3102, In FIG. 12, "x" indicates that the image is erased (discarded).

In step S4403, a rotated image of the image A is generated again in response to a request from the PD printer 1000. This corresponds to a case wherein the PD printer 1000 cannot rasterize both the images A and B in FIG. 11 on the memory 3003 and requests partial image data of the images A and B. In step S4403, the rotated image data of the image B generated in step S4402 is erased. In this way, generation and discard of the rotated images of the images A and B are sequentially repeated in response to a request from the PD printer 1000. When the images A and B have been printed, printing of the images C and D starts in step S4405.

In step S4405, a rotated image of the image C is generated in response to a request from the PD printer 1000. At this time, the rotated image data of the image B generated in step S4404 is erased from the memory 3102. In step S4406, a rotated image of the image D is generated in response to a request from the PD printer 1000. At this time, the rotated image data of the image C generated in step S4405 is erased from the memory 3102. In this way, generation and discard of the rotated images of the images C and D are sequentially repeated in response to a request from the PD printer 1000. When the images C and D have been printed, the process of the print job is ended.

Normally in PTP, when an image saved in the memory card 3109 and associated with an object handle is erased, the DSC 3012 issues "ObjectRemoved" to the PD printer 1000. However, when rotated and/or resized image data corresponding to a virtual object handle assigned in step S105 in FIG. 10A is erased for the memory 3109, the DSC 3012 issues no "ObjectRemoved". The DSC 3012 preferably issues "ObjectRemoved" to the PD printer 1000 after the print job is processed. This is because if the DSC 3012 issues, to the PD printer 1000, "ObjectRemoved" for the object handle of the print target during the progress of the print job, the PD printer 1000 may determine that the DSC 3012 cannot continue printing any longer.

The virtual object handles are immediately discarded after completion of the print job to prevent the rotation and/or resize target images corresponding to the virtual object handles from being used for any purpose other than printing. No one can deny the possibility that the PTP Initiator may issue some PTP Operation for the rotation and/or resize target images corresponding to the virtual object handles. For example, assume that the memory card 3109 having a capacity to store 10 images is storing 10 images (real object handles 1 to 10), and virtual object handles (virtual object handles 11 to 20) are assigned to the images. Upon receiving the real object handles and virtual object handles of the images, the PD printer 1000 determines that the memory card 3109 is storing a total of 20 images (because the PD printer 1000 cannot determine the capacity of the memory card 3109). In this state, the PD printer 1000 may issue a command "MoveObject", that is, a request to "move" the image of, for example, an object handle 1 to a virtual object handle 15. In this case, the DSC 3012 must return a message "no sufficient memory card capacity remains" to the PD printer 1000 because the image movement in the memory card 3109 is impossible due to shortage in the remaining capacity of the memory card 3109. However, the PD printer 1000 (Initiator) side does not assume the occurrence of the case "no sufficient memory card capacity remains" in the process of moving an object that should exist on the memory card 3109. Hence, this error may impede subsequent communication. For this reason, the virtual object handles must be discarded immediately after completion of the print job.

The means for implementing the purpose of "immediately discarding the virtual object handles" is not particularly limited to completion of the print job. For example, when the DSC 3012 issues a print job of a plurality of pages, the completion of printing of a page can be regarded as almost equivalent to the "completion of the print job" for a virtual object handle that has been printed on that page and would not be printed on subsequent pages. Hence, the DSC 3012 can determine virtual object handles that can be discarded by confirming the state of progress of the print job issued by the PD printer 1000.

As described above, according to the first embodiment, the DSC 3012 can safely and reliably generate a print image requested by the PD printer 1000 and supply the print image to it by using a virtual object handle in printing.

The print job determines assignment of virtual object handles, and then, the virtual object handles are deleted immediately after completion of the print job. For this reason, any access to the virtual object handles by an operation except the print job can be prevented.

Second Embodiment

Figure 13A:
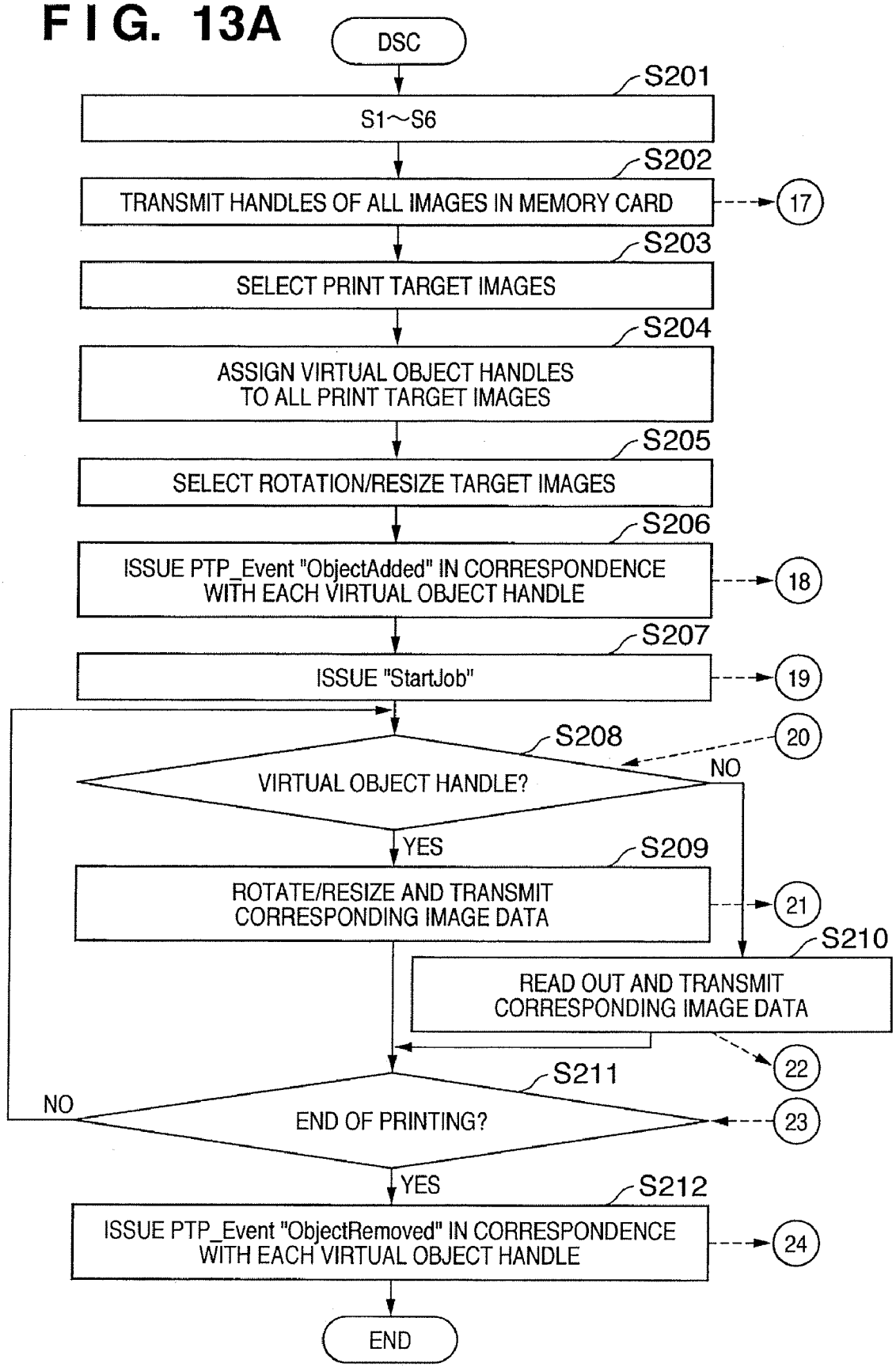
FIGS. 13A and 13B are flowcharts for explaining the processes of a DSC and a PD printer in a printing system according to the second embodiment of the present invention.
Figure 13B:
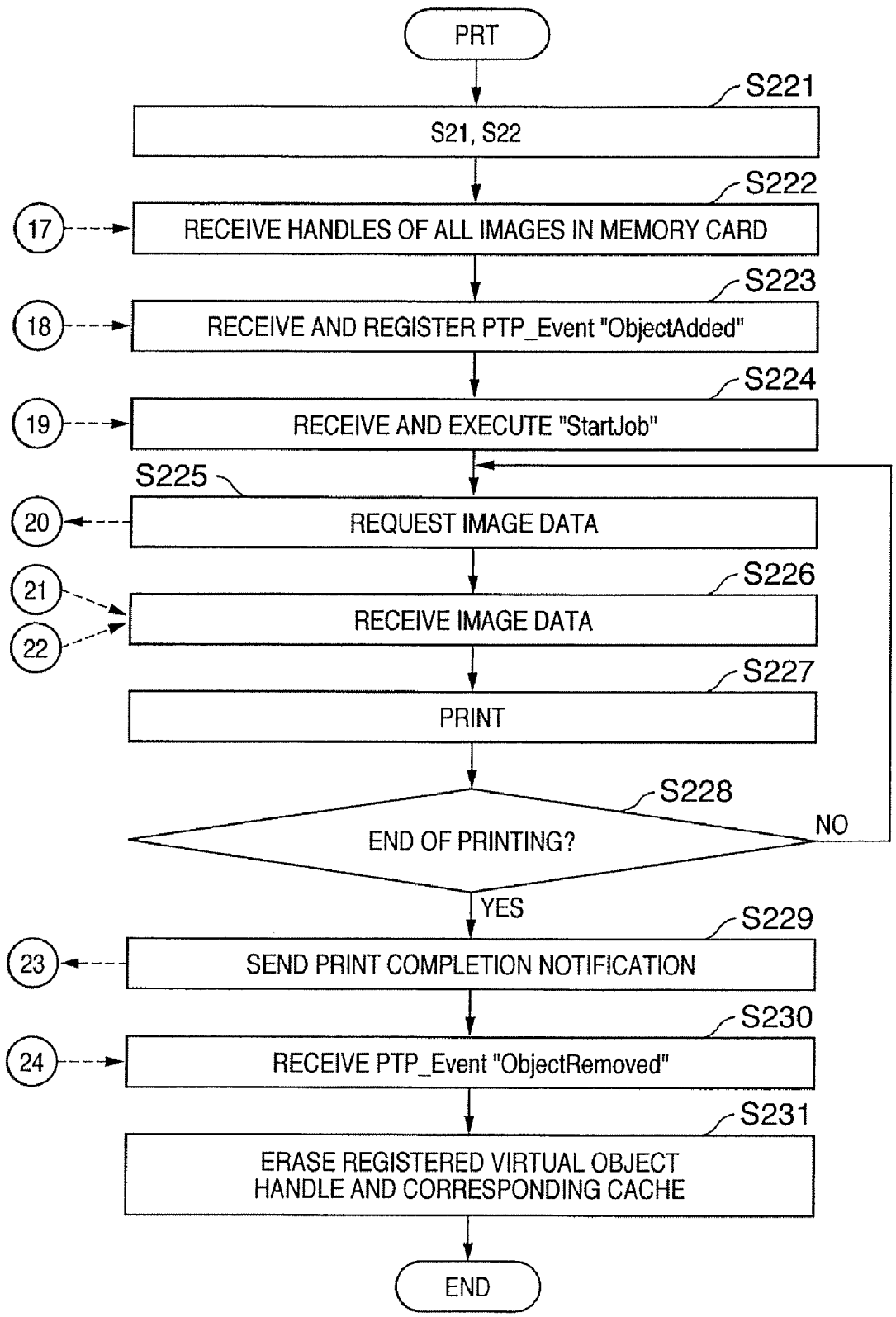

FIGS. 13A and 13B are flowcharts for explaining the processes of a DSC 3012 and a PD printer 1000 in a printing system according to the second embodiment of the present invention. In the second embodiment, when the DSC 3012 executes a process such as rotation or resize, a print job that designates a process target image by a virtual object handle in a print object is issued and printed, as in the above-described first embodiment. The second embodiment is different from the above-described first embodiment in that the DSC 3012 sets virtual object handles for all images set as a print target. Referring to FIGS. 13A and 13B, the DSC 3012 executes the process in steps S201 to S212, and the PD printer 1000 executes the process in steps S221 to S231. The programs to cause the DSC 3012 and PD printer 1000 to execute the processes are stored in a ROM 3101 of the DSC 3012 and a program memory 3003a of the PD printer 1000, respectively. Step S201 corresponds to the process in steps S1 to S6 in FIG. 6A. Step S221 corresponds to the process in steps S21 and S22 in FIG. 6B. In the following explanation, the DSC 3012 executes rotation and resize of an image as an image process. However, the present invention is not limited to this. The process may further include, for example, color conversion of an image.

In step S202, the USC 3012 transmits, to the PD printer 1000, the list of the real object handles of all images stored in a memory card 3109. In step S222, the PD printer 1000 receives the list and grasps all images stored in the memory card 3109 of the DSC 3012 as the communication partner.

In step S203, the user selects print target images from the images stored in the memory card 3109 by using the UI of the DSC 3012. In step S204, virtual object handles are assigned to all the selected print target images. In step S205, the user selects images that require rotation and/or resize from the selected print target images. This selection may be done automatically. In this case, whether rotation or resize is necessary is determined by using any of the above-described selection criteria by, for example, referring to the aspect ratio of each image and that of a print paper sheet. In step S206, the DSC 3012 issues PTP_Event "ObjectAdded" to the PD printer 1000 in correspondence with each of the virtual object handles of the images selected in step S204 as print targets. "ObjectAdded" notifies the PD printer 1000 of the existence of a virtual object handle except the object handle transmitted in step S202. In step S223, the PD printer 1000 receives "ObjectAdded" and registers the virtual object handle. This makes it possible to designate the image by using the virtual object handle in the subsequent process. The process in step S203 is unnecessary when all images stored in the memory card 3109 are to be printed. In this case, the real object handles and virtual object handles of all images stored in the memory card 3109 are transmitted in step S202.

In step S207, the DSC 3012 issues a print job (StartJob) to the PD printer 1000. The print job includes the real object handles and virtual object handles of the rotation and/or resize target images based on the user selection process using the UI in steps S203 and S205. StartJob designates not a virtual object handle but a real object handle for an image that requires no rotation and/or resize.

In step S224, the PD printer 1000 receives the print job and starts executing it. In step S225, the PD printer 1000 requests the image data contained in the print job of the DSC 3012 by using each object handle (GetObjectInfo and GetObject).

Upon receiving the request, the DSC 3012 checks in step S208 whether the object handle of the requested image is a virtual object handle. If the object handle is a virtual object handle, the process advances to step S209 to read out and decode image data having a real object handle corresponding to the virtual object handle. Then, the image data is resized and/or rotated. The resized and/or rotated image data is encoded and transmitted to the PD printer 1000. The rotation and resize process executed by the DSC 3012 is the same as in FIGS. 6A, 6B and FIG. 8, and a description thereof will be omitted.

If the received object handle is a real object handle in step S208, the process advances to step S210 to read out image data corresponding to the real object handle and transmit the data to the PD printer 1000. When step S209 or S210 is executed, the process advances to step S211 to determine whether a print completion notification is received from the PD printer 1000. If printing has not ended yet, the process returns to step S208 to wait for reception of the next image request. If a print completion notification is received in step S211, the process advances to step S212 to issue PTP_Event "ObjectRemoved" in correspondence with each virtual object handle. This erases the virtual object handles unique to the print job and data added to them, which are registered in the PD printer 1000.

On the other hand, the PD printer 1000 requests the image data in step S225 and receives the image data transmitted from the DSC 3012 (in step S209 or S210) in step S226. In step S227, the image data is decoded, rasterized to print data, and printed. In step S228, it is determined whether all images contained in the print job are printed. If the result is NO in step S228, the process returns to step S225 to execute the above-described process. If printing is ended in step S228, the process advances to step S229 to notify the DSC 3012 of completion of printing. In step S230, PTP_Event "ObjectRemoved" is received. The process advances to step S231 to erase the virtual object handles registered in step S223. If image data are cached in correspondence with the virtual object handles, the cached image data are erased.

In the second embodiment, when the DSC 3012 sets all images held in the memory card 3109 or all printable images as print target images, that is, the virtual object handles need not be generated or erased during the direct print process, the processes in steps S203, S204, S223, and S230 can be skipped.

In the above-described way, virtual object handle assignment and print job issue can be made irrelevant to each other. Hence, it is unnecessary to issue "ObjectAdded" and "ObjectRemoved" in every print job issue.

When a virtual object handle is assigned in accordance with communication connection between the DSC 3012 and the PD printer 1000, access to the virtual object handle for any purpose other than direct printing can be prevented. It is preferable to prevent access to the virtual object handle from another host such as a PC. This is because "it may be impossible to ensure a sufficient memory card capacity for Move of an Object", as described in the first embodiment. As another example, if a PC can access virtual object handles corresponding to all images in the memory card 3109, the total image size corresponding to the real object handles and virtual object handles may exceed the capacity of the memory card 3109 (as in the above-described example). A host such as a PC may not expect a "state wherein images beyond the memory card capacity are saved". This may impede connection to the PC after acquisition of unexpected information.

Third Embodiment

Figure 14A:
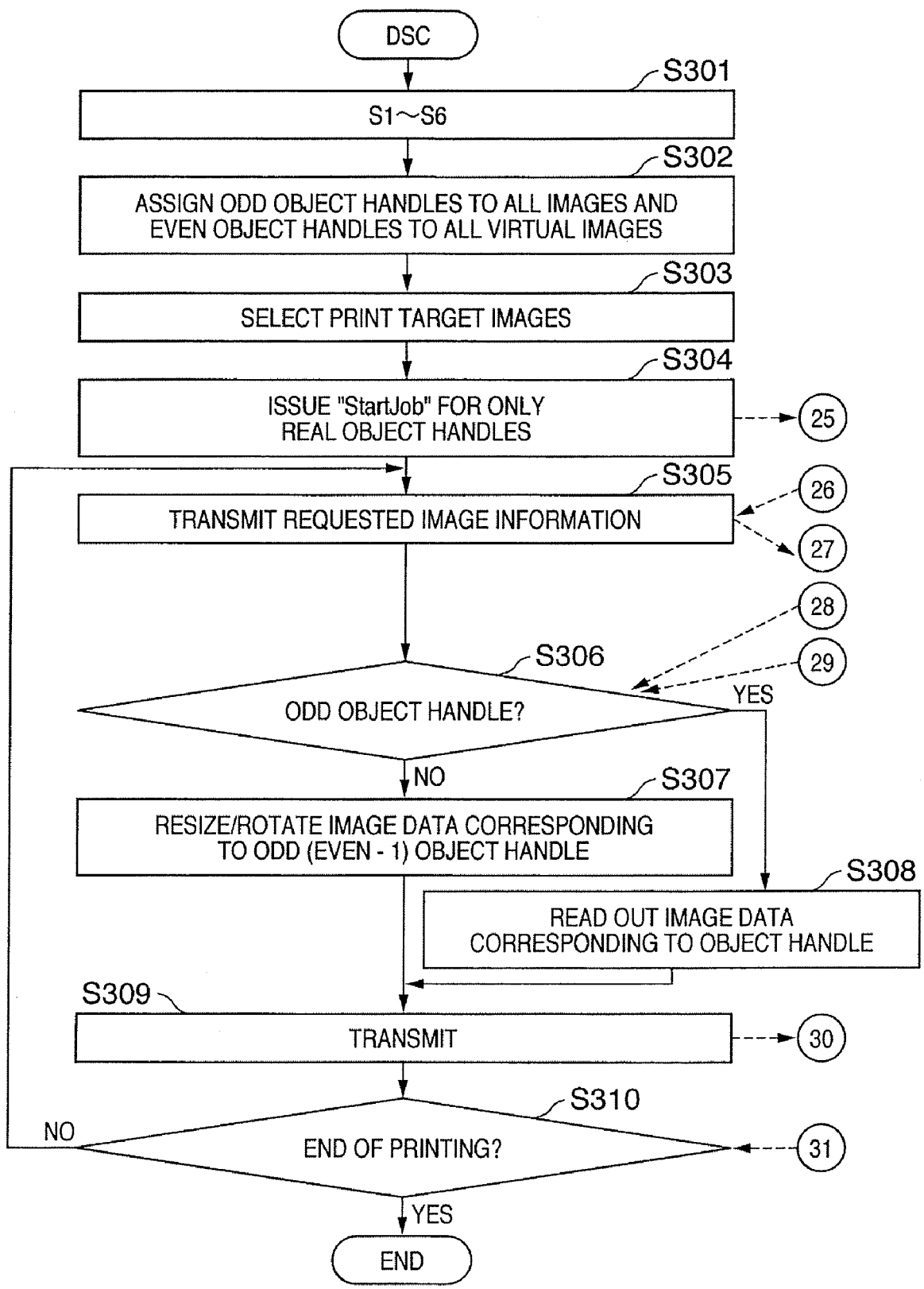
FIGS. 14A and 14B are flowcharts for explaining the processes of the DSC and PD printer in the printing system according to the third embodiment of the present invention.
Figure 14B:
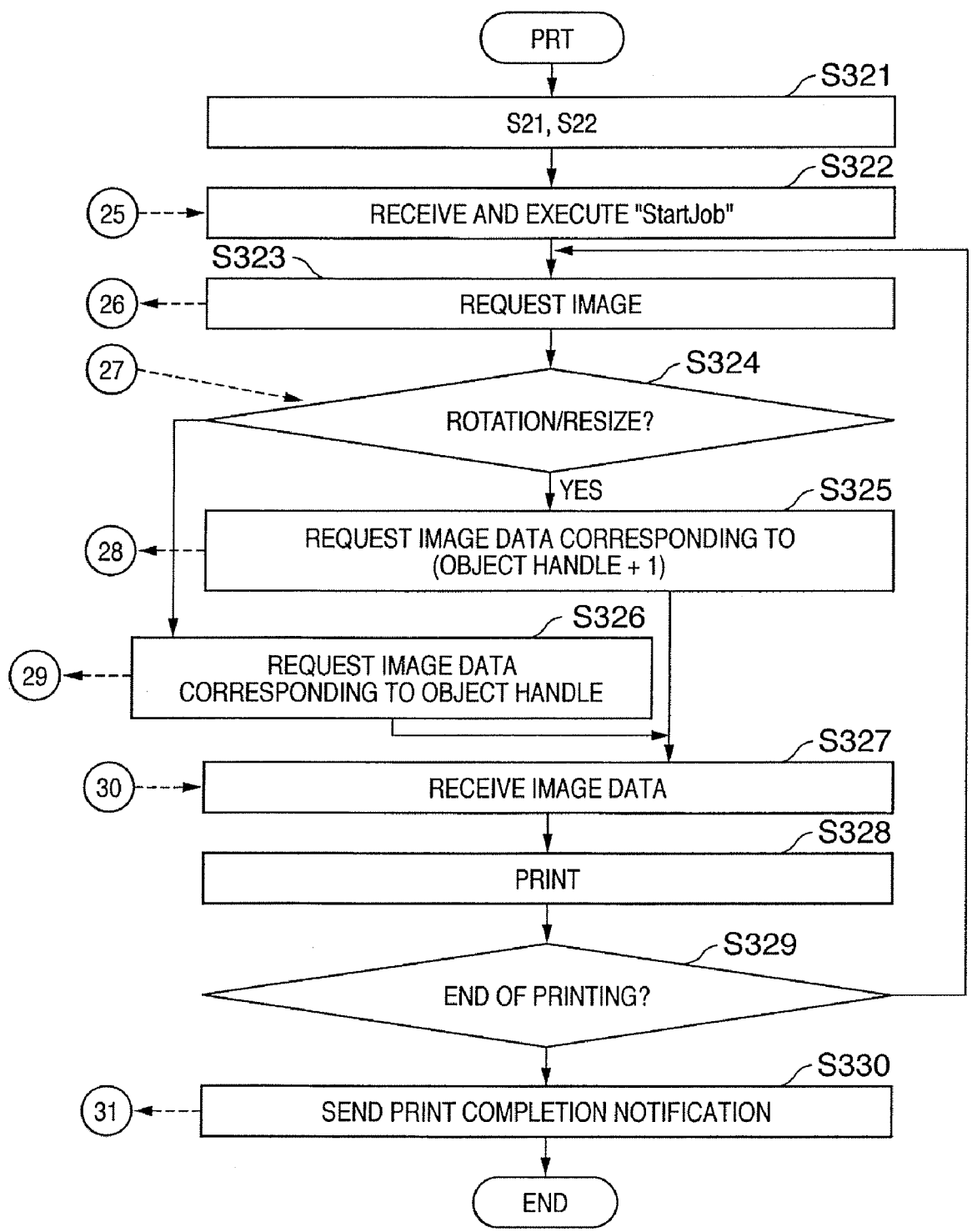

FIGS. 14A and 14B are flowcharts for explaining the processes of a DSC 3012 and a PD printer 1000 in a printing system according to the third embodiment of the present invention. In the third embodiment, a virtual object handle is set as the object handle of a rotation and/or resize target image. The number of the virtual object handle is made discriminable from a real object handle. In the third embodiment, an odd number is assigned to a real object handle, and an even number is assigned to a virtual object handle. In the third embodiment, hence, the DSC 3012 and PD printer 1000 need to cooperate, and the PD printer 1000 must know in advance which object handle is a virtual object handle. Referring to FIGS. 14A and 14B, the DSC 3012 executes the process in steps S301 to S310, and the PD printer 1000 executes the process in steps S321 to S330. The programs to cause the DSC 3012 and PD printer 1000 to execute the processes are stored in a ROM 3101 of the DSC 3012 and a program memory 3003a of the PD printer 1000, respectively. Step S301 corresponds to the process in steps S1 to S6 in FIG. 6A. Step S321 corresponds to the process in steps S21 and S22 in FIG. 6B. In the following explanation, the DSC 3012 executes rotation and resize of an image as an image process. However, the present invention is not limited to this. The process may further include, for example, color conversion of an image.

In step S302, odd real object handles and even virtual object handles are assigned to all images stored in a memory card 3109. In step S303, the user selects print target images from the images stored in the memory card 3109 by using the UI of the DSC 3012. In step S304, the DSC 3012 issues, to the PD printer 1000, a print job (StartJob) including real object handles based on the user selection process using the UI in step S303.

In step S322, the PD printer 1000 receives the print job and starts executing it. In step S323, the PD printer 1000 requests the information of an image contained in the print job of the DSC 3012 by using each object handle (GetObjectInfo) Upon receiving the request, the DSC 3012 transmits the requested image information (ObjectInfo) to the PD printer 1000 in step S305. In step S324, the PD printer 1000 receives the image information and determines based on the information whether the image data of the image requires rotation and/or resize. If rotation and/or resize is necessary, the process advances to step S325 to request, of the DSC 3012, image data corresponding to an object handle obtained by incrementing the number of the object handle of the image by one (GetObject). If it is determined in step S324 that rotation and/or resize is unnecessary, the process advances to step S326 to request image data corresponding to the object handle (GetObject).

Upon receiving the request, the DSC 3012 determines in step S306 whether the number of the object handle is an odd number (real object handle). If the object handle has an odd number, the process advances to step S308 to read out image data corresponding to object handle (real object handle). Then, the process advances to step S309. If the number of the object handle is not an odd number in step S306, the process advances to step S307 to read out image data corresponding to a real object handle obtained by decrementing the number of the received object handle by one and decode the image data. The image data is resized and/or rotated. The resized and/or rotated image data is encoded, the process advances to step S309. In step S309, the encoded image data is transmitted to the PD printer 1000. The rotation and resize process executed by the DSC 3012 is the same as in FIGS. 6A, 6B and FIG. 8, and a description thereof will be omitted. The process advances to step S310 to determine whether a print completion notification is received from the PD printer 1000. If the printing has not ended yet, the process returns to step S305 to wait for reception of the next image request. If a print completion notification is received in step S310, the process is ended.

After requesting image data in step S325 or S326, the PD printer 1000 receives the image data transmitted from the DSC 3012 in step S327. In step S328, the received image data is decoded, rasterized to print data, and printed. In step S329, it is determined whether all images contained in the print job are printed. If the result is NO in step S329, the process returns to step S323 to execute the above-described process. If the printing has ended in step S329, the process advances to step S330 to notify the DSC 3012 of completion of printing.

In the third embodiment, the DSC 3012 and PD printer 1000 must share the object handle assignment rule. To mutually confirm the assignment rule, any existing method can be used. For example, the vender name or device name of the connection partner is used, or a keyword unique to the rule is exchanged. At the point of time of step S302, no rotated or resized image data corresponding to an even object handle is present in the DSC 3012. Only original image data corresponding to an odd object handle is present.

As described above, according to the third embodiment, the PD printer 1000 determines whether rotation and/or resize of an image is necessary and executes the process. Hence, the DSC 3012 can more safely and reliably generate a print image suitable for the PD printer 1000.

In the above-described third embodiment, it is unknown whether an image stored in the memory card 3109 of the DSC 3012 has a portrait or landscape format. However, if a rule to assign an odd object handle to a landscape image and an even object handle to a portrait image is set in advance between the DSC 3012 and the PD printer 1000, the image information request process in step S323 in FIG. 14B can be omitted.

In the third embodiment, rotation images and non-rotation images are assigned to even object handles and odd object handles, respectively. However, the assignment rule is not limited to this. For example, a number of (rotation image+X) may be assigned to a non-rotation image (X is an arbitrary integer). Rotation/non-rotation of an image may be designated by a specific bit of an object handle. That is, any method can be used if it can associate a rotation and/or resize image with a corresponding original image.

The description of the third embodiment has been done assuming that both devices mutually recognize that they share the assignment rule. However, sharing of the assignment rule is not always necessary. It is sufficient that the PD printer 1000 recognizes that the DSC 3012 is a "device that supports the assignment rule". The DSC 3012 can operate in accordance with the assignment rule without knowing whether the PD printer 1000 as the connection partner is a "device that supports the assignment rule". This is because a PD printer 1000 supporting the assignment rule requests image data by using an even object handle as needed. A PD printer 1000 that does not support the assignment rule always requests image data by using an odd object handle.

Other Embodiments

The objects of the present invention are also achieved by supplying a storage medium which records software program codes to implement the functions of the embodiments to a system or apparatus and causing the computer (or CPU or MPU) of the system or apparatus to read out and execute the program codes. In this case, the program codes read out from the storage medium themselves implement the functions of the above-described embodiments. The storage medium that stores the program codes constitutes the present invention. Examples of the storage medium to supply the program codes are a Floppy® disk, hard disk, optical disk, magnetooptical disk CD-ROM, CD-R, magnetic tape, nonvolatile memory card, and ROM.

The functions of the above-described embodiments are implemented by causing the computer to execute the readout program codes and by causing the OS running on the computer to wholly or partially execute actual processing based on the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit wholly or partially executes actual processing based on the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

CLAIM OF PRIORITY

This application claims the benefit of Japanese Patent Application No. 2004-306899 filed Oct. 21, 2004, which is hereby incorporated by reference herein in its entirety.

The invention claimed is:

1. An image supply device for supplying image data to a printing device, comprising: setting means for setting first reference information and second reference information to, of images to be supplied to the printing device, images that require a predetermined image process; job issuance means for issuing a print job including reference information of a print target image in accordance with a print instruction using the printing device; first image supply means for supplying, to the printing device, image data which corresponds to the first reference information and has undergone the predetermined image process, in a case that the reference information of an image requested by the printing device in response to the print job issued by said job issuance means is the first reference information; and second image supply means for supplying, to the printing device, image data which corresponds to the second reference information and is read out, in a case that the reference information of an image requested by the printing device in response to the print job issued by said job issuance means is the second reference information.

2. The image supply device according to claim 1, further comprising: setting notification means for notifying the printing device of setting of the second reference information; and invalidation instruction means for instructing the printing device to invalidate the second reference information upon completion of the print job.

3. The image supply device according to claim 1, further comprising: setting notification means for notifying the printing device of setting of the second reference information; and invalidation instruction means for instructing the printing device to invalidate the second reference information upon updating a print page.

4. The image supply device according to claim 1, further comprising: setting notification means for notifying the printing device of setting of the second reference information; and discard instruction means for instructing the printing device to discard the second reference information upon updating a print page.

5. The image supply device according to claim 1, wherein the image to be supplied to the printing device is a print target image designated by a user.

6. The image supply device according to claim 1, wherein the second reference information refers to actually stored image data, and the first reference information refers to actually nonexistent image data corresponding to the second reference information.

7. The image supply device according to claim 1, wherein the predetermined image process includes at least one of rotation, scaling, and color conversion of an image.

8. A control method of an image supply device for supplying image data to a printing device, comprising: a setting step of setting first reference information and second reference information to, of images to be supplied to the printing device, images that require a predetermined image process; a job issuance step of issuing a print job including reference information of a print target image in accordance with a print instruction using the printing device; a first image supply step of supplying, to the printing device, image data which corresponds to the first reference information and has undergone the predetermined image process, in a case that the reference information of an image requested by the printing device in response to the print job issued in said job issuance step is the first reference information; and a second image supply step of supplying, to the printing device, image data which corresponds to the second reference information and is read out, in a case that the reference information of an image requested by the printing device in response to the print job issued in said job issuance step is the second reference information.

9. The control method of the image supply device according to claim 8, further comprising: a setting notification step of notifying the printing device of setting of the second reference information; and an invalidation instruction step of instructing the printing device to invalidate the second reference information upon completion of the print job.

10. The control method of the image supply device according to claim 8, wherein the image to be supplied to the printing device is a print target image designated by a user.

11. The control method of the image supply device according to claim 8, wherein the second reference information refers to actually stored image data, and the first reference information refers to actually nonexistent image data corresponding to the second reference information.

12. The control method of an image supply device according to claim 8, wherein the predetermined image process includes at least one of rotation, scaling, and color conversion of an image.

13. A printing system in which an image supply device supplies image data to a printing device to print, wherein the image supply device comprising: setting means for setting first reference information and second reference information to, of images to be supplied to the printing device, images that require a predetermined image process and remaining images, respectively; job issuance means for issuing a print job including reference information of a print target image in accordance with a print instruction using the printing device; first image supply means for supplying, to the printing device, image data which corresponds to the first reference information and has undergone the predetermined image process, in a case that the reference information of an image requested by the printing device in response to the print job issued by said job issuance means is the first reference information; and second image supply means for supplying, to the printing device, image data which corresponds to the second reference information and is read out, in a case that the reference information of an image requested by the printing device in response to the print job issued by said job issuance means is the second reference information, and the printing device comprising: image request means for requesting image data of the image supply device by using the reference information of the image included in the print job, wherein the printing device receives and prints image data transmitted from the image supply device in response to a request by said image request means.

14. The printing system according to claim 13, wherein the predetermined image process includes at least one of rotation, scaling, and color conversion of an image.

15. The printing system according to claim 13, wherein the predetermined image process includes at least one of rotation, scaling, and color conversion of an image.

* * * * *